United States Patent [19]

Nakata et al.

[11] 4,138,734
[45] Feb. 6, 1979

[54] ELECTRONIC EQUIPMENT CAPABLE OF ARITHMETIC OPERATIONS

[75] Inventors: Shinichi Nakata, Kawasaki; Reiji Hirano, Yokohama, both of Japan

[73] Assignee: Canon Kabushiki Kaisha, Tokyo, Japan

[21] Appl. No.: 834,809

[22] Filed: Sep. 19, 1977

[30] Foreign Application Priority Data

| Oct. 1, 1976 | [JP] | Japan | 51-118333 |
|---|---|---|---|
| Oct. 1, 1976 | [JP] | Japan | 51-118334 |
| Oct. 8, 1976 | [JP] | Japan | 51-121063 |
| Oct. 8, 1976 | [JP] | Japan | 51-121064 |
| Oct. 13, 1976 | [JP] | Japan | 51-122545 |
| Nov. 5, 1976 | [JP] | Japan | 51-132820 |

[51] Int. Cl.$^2$ .......................... G06F 15/02; G06F 3/14
[52] U.S. Cl. ............................................................. 364/710
[58] Field of Search ......................... 364/706, 709, 710

[56] References Cited

U.S. PATENT DOCUMENTS

| 3,553,445 | 1/1971 | Hernandez | 364/709 |
|---|---|---|---|
| 3,678,466 | 7/1972 | Spangler | 364/200 |
| 3,760,171 | 9/1973 | Wang et al. | 364/710 X |
| 3,787,988 | 1/1974 | Nakajima et al. | 364/709 X |
| 4,016,411 | 4/1977 | Genin | 364/710 X |

Primary Examiner—Jerry Smith
Attorney, Agent, or Firm—Fitzpatrick, Cella, Harper & Scinto

[57] ABSTRACT

Electronic equipment capable of arithmetic operations displays operands, four function symbols, an "equal" symbol and results in various modes. According to one embodiment, a first operand, a function symbol, a second operand and a result with an "equal" symbol are displayed in the order named on two or three display panels. Alternatively, in order to reduce the power consumption, they may be displayed one at a time on one display panel. According to another embodiment of the present invention, the result of an arithmetic operation, the steps of which are displayed in the manner described above, is added to the contents of a so-called independent memory, and both the result and the new content of the memory may be displayed at the same time. In a further embodiment, the number of arithmetic operations executed may be displayed, and in accordance with a yet further embodiment, a result which overflows a display panel may be displayed on two display panels at the same time.

14 Claims, 33 Drawing Figures

| D0 ~ D3 HEXADECIMAL CODES | INDICATIONS | D0 ~ D3 HEXADECIMAL CODES | INDICATIONS |
|---|---|---|---|
| 0 | ⊡ | 8 | 8 |
| 1 | 1 | 9 | 9 |
| 2 | 2 | A | ÷ |
| 3 | 3 | B | X |
| 4 | 4 | C | + |
| 5 | 5 | D | − |
| 6 | 6 | E | E |
| 7 | 7 | F | BLANK |

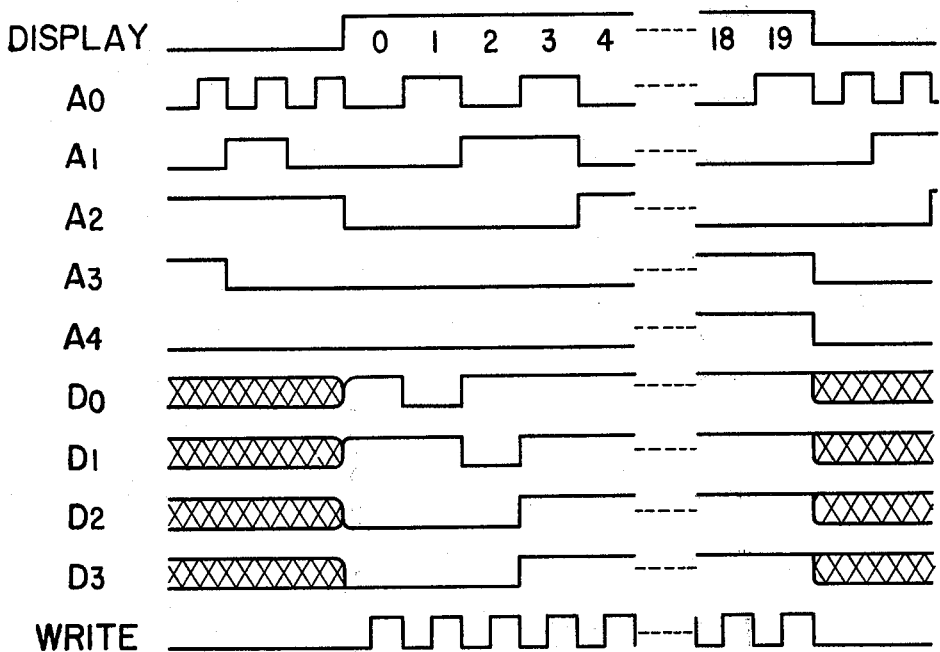

| | KEY OPERATIONS | INDICATION EXAMPLES |
|---|---|---|
| (a) | 1 2 3 | 123 |
| (b) | × | 123<br>× |
| (c) | 4 5 6 | 123<br>× 456 |
| (d) | × | 56088<br>× |
| (e) | 7 8 9 | 56088<br>× 789 |
| (f) | = | 44253432 |

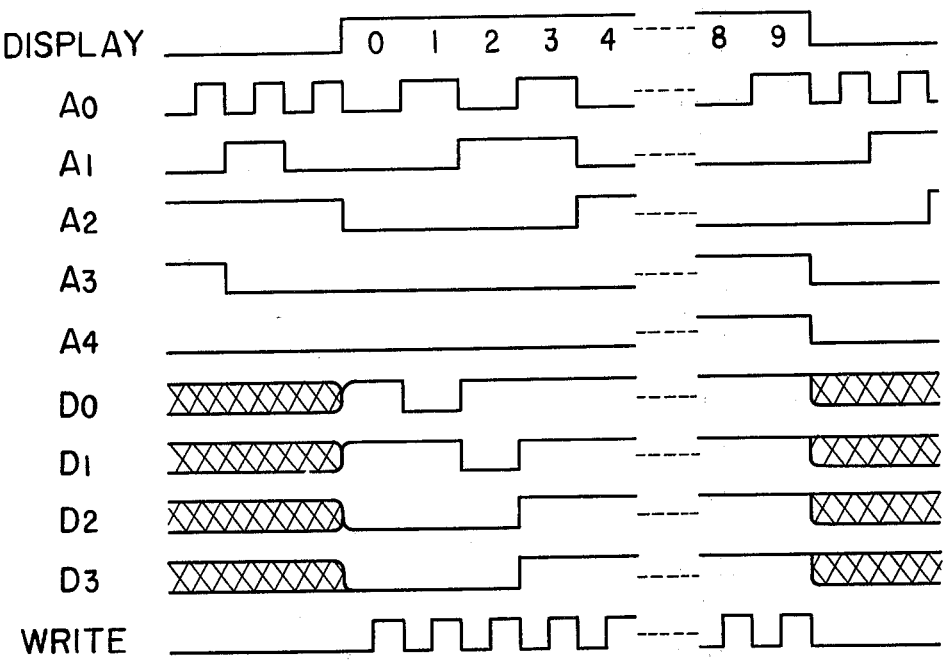

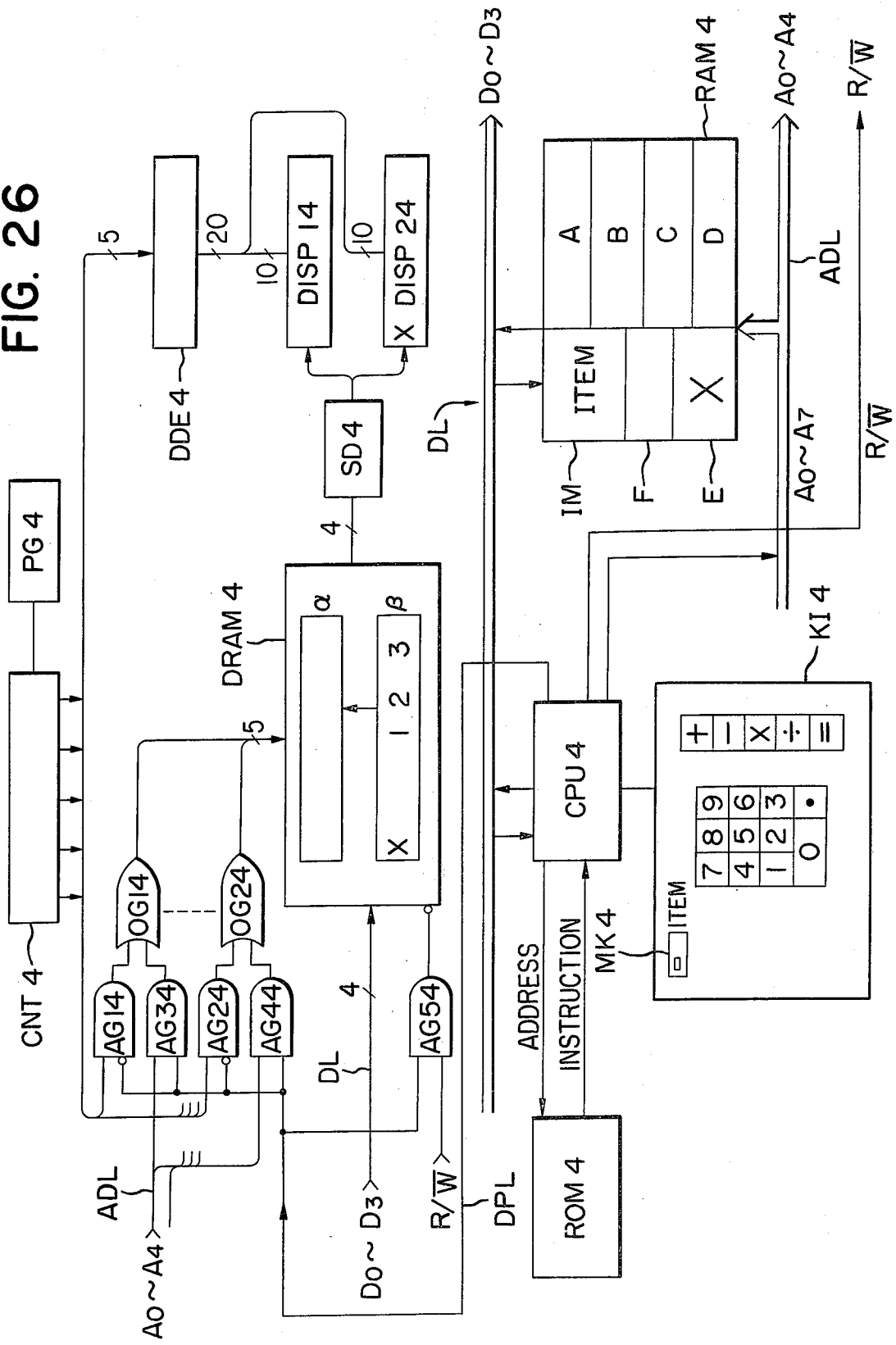

ELECTRONIC EQUIPMENT CAPABLE OF ARITHMETIC OPERATIONS

BACKGROUND OF THE INVENTION

1. Field of the Invention

The present invention relates to electronic equipment capable of arithmetic operations.

2. Description of the Prior Art

Prior art electronic calculators generally have one display panel on which numeric data entered first (to be referred to as "a first operand" in this specification), numeric data entered second (to be referred to as "a second operand" in this specification) and a result of an arithmetic operation of the first and second operands are sequentially displayed one by one in the order named. As a result, when an operator suspends and then restarts arithmetic operations, he may not identify very frequently whether the numeric data being displayed is a first or second operand or a result and, if it is the result, by what arithmetic operation this result has been obtained.

Furthermore with prior art electronic calculators with a so-called independent memory, the contents thereof is in general not displayed so that the operator must depress a key in order to fetch and display the contents of the independent memory.

The power consumption of the arithmetic-logic units, memories, registers and so on in the electronic calculators has been recently drastically reduced because of the rapid development of the semiconductor device technology, but the power consumption of display panels is still high. Therefore, the batteries of a battery-operated electronic pocket type calculator or the like must be changed at a relatively short interval of time.

There has been devised and demonstrated an electronic calculator capable of itemizing or recording the number of arithmetic operations executed by the operation of a switch or the like, but the operation is very cumbersome and inconvenient.

In general, small electronic calculators include 8-digit registers and an 8-array display panel for displaying 8-digit numeric data, but it occurs very often that the number of digits of the result from the operation of the first and second operands exceeds eight digits so that the total digits of result the cannot be displayed on the display panel. In order to solve this overflow problem, there have been proposed and demonstrated the following three display methods:

1. " E        0 ",
2. " E 7 6 9.2 5 9 2 5 ", and
3. "    7 6 9.2 5 9 2 5 "
   depress " P " key, and then
   " 8 4 8.0 0 0 0 0 0 ".

The first method does not display the result at all. The second method omits some lower digits, and the operator cannot identify how many lower digits are omitted. According to the third method, the result is stored in two registers. Upon depression of the "equal" key, the higher digits bits of the result are displayed and upon a subsequent depression of the key "P", the lower digits are displayed. As a result, the operator cannot see the result at one glance, and the keying operation is complex.

SUMMARY OF THE INVENTION

The present invention was made to solve the above and other problems encountered in the prior art electronic calculators.

Accordingly, one of the objects of the present invention is to provide electronic equipment capable of displaying at one time a plurality of numeric data with or without an operational instruction symbol such as "X, ÷, +, − and =".

Another object of the present invention is to provide electronic equipment capable of displaying the contents of a stand-by register.

A further object of the present invention is to provide electronic equipment capable of displaying the contents of a so-called independent memory.

A still further object of the present invention is to provide electronic equipment capable of displaying not only numeric data being processed or having been processed together with the number of arithmetic operations executed.

A yet further object of the present invention is to provide electronic equipment capable of displaying the result of an arithmetic operations of first and second operands simultaneously on two display panels which are used for displaying the first and second operands, respectively.

The above and other objects, features and advantages of the present invention will become apparent from the following description of preferred embodiments thereof taken in conjunction with the accompanying drawings.

BRIEF DESCRIPTION OF THE DRAWINGS

FIG. 4 shows various signal waveforms used for the explanation of the mode of operation of the first embodiment;

FIG. 5 is a table showing the relationship between the key operations and the resulting displays;

FIG. 10 is a table showing the relationship between the key operations and the resulting displays;

FIG. 16 shows various signal waveforms used for the explanation of the mode of operations of the third embodiment;

FIG. 17 is a table showing the relationship between the key operations and the resulting displays when the selection switch is set to "MEMORY";

FIG. 26 is a schematic block diagram of the fifth embodiment;

FIG. 30 is a top view of a sixth embodiment of the present invention;

FIGS. 32 and 33 show, respectively, the sequence of numeric data displays and the change and shift in the contents of registers R15, R25 and R35, both used for the explanation of the mode of operation of the sixth embodiment.

DESCRIPTION OF THE PREFERRED EMBODIMENTS

First Embodiment, FIGS. 1 - 7

Figures 1, 3:
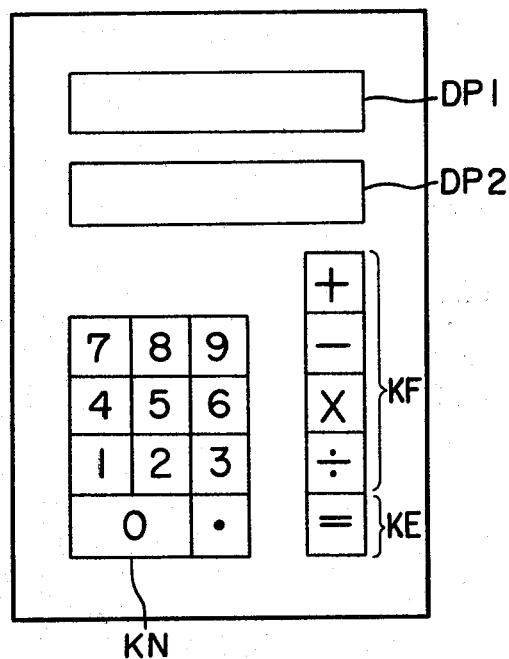
FIG. 1 is a top view of a first embodiment of the present invention.
FIG. 3 shows the relationship between the hexadecimal digits and the corresponding display symbols used in the present invention.

Referring first to FIG. 1, electronic equipment capable of arithmetic operation in accordance with the present invention includes first and second display devices or panels DP1 and DP2 of the liquid crystal, light-emitting diode or plasma display type which may simultaneously display a first operand and a second operand. The electronic equipment further includes a keyboard with numeral or numeric keys KN for entering numeric data, functional or operation keys KF for specifying four fundamental arithmetic operations to be executed and an execution or "equal" key KE for starting a specified arithmetic operation of the first and second operands entered and obtaining a result thereof.

Figure 2:
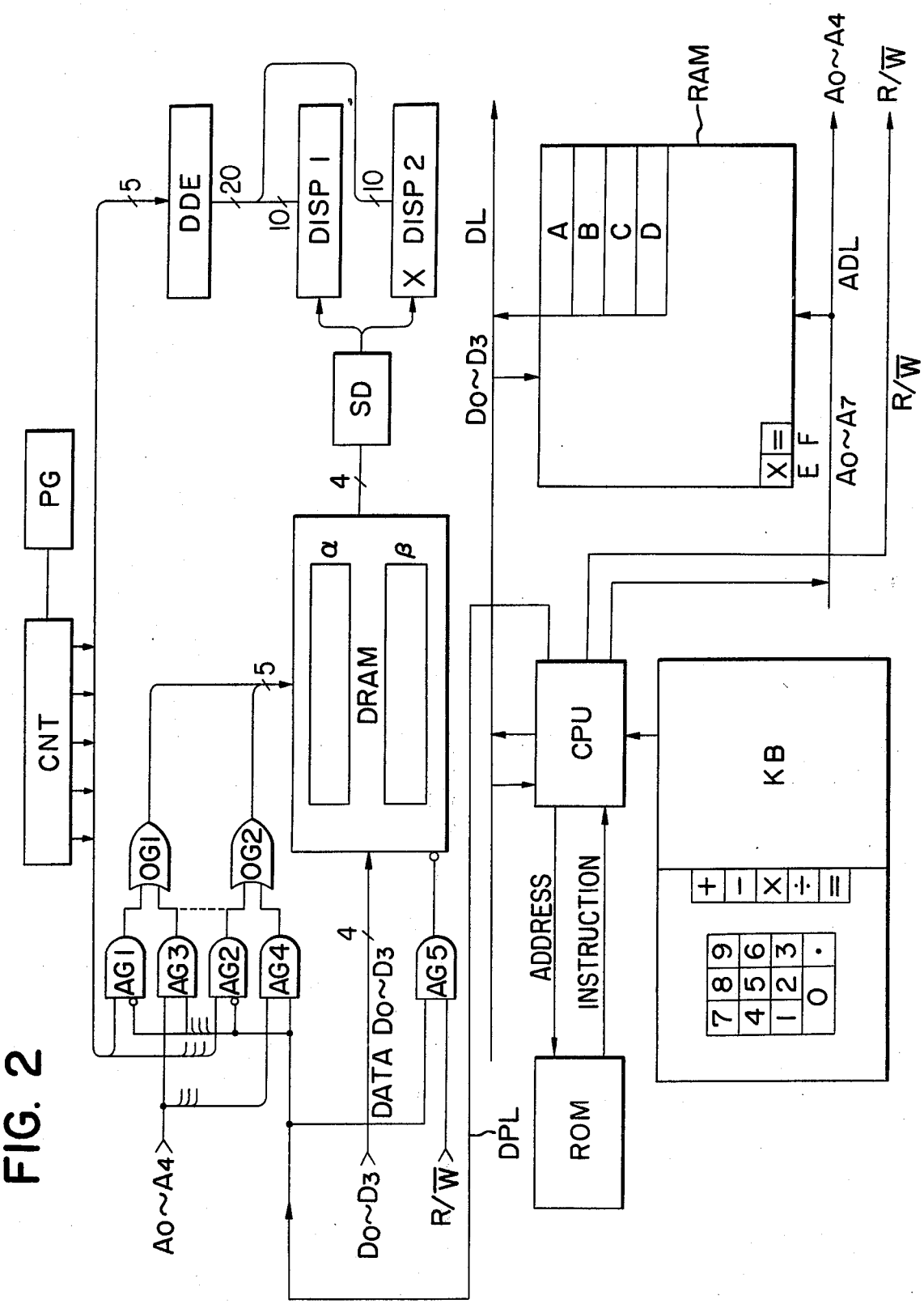
FIG. 2 is a schematic block diagram of the first embodiment.

In FIG. 2 there is shown a block diagram of the electronic equipment shown in FIG. 1. The electronic device includes a keyboard KB or an input unit with the numeral keys KN, the functional keys KF and the execution key KE for generating a key signal when one of its keys KN, KF and KE is depressed in a manner well known in the art.

A central processing unit CPU is responsive to the key signal from the input unit KB and other signals to be described hereinafter for fetching the coded instructions, data and so on from a read-only memory ROM, which stores therein various data and control sequences, and transmitting them to other circuits.

A random access memory RAM stores therein numeric data and signals or instructions for discriminating various signals or data.

A random access memory DRAM stores numeric data to be displayed. The contents of an addressed word of memory in the random access memory DRAM is transmitted to a segment decoder SD, the outputs of which are transmitted to first and second display circuits DISP1 and DISP2 in the first and second display devices or panels DP1 and DP2 shown in FIG. 1.

The random access memory DRAM has 20 memory words. That is, the outputs from a modulo-20 counter CNT are transmitted in parallel through gates AG1, AG2, OG1 and OG2 to the random access memory DRAM, and the contents of the random access memory DRAM is in turn transmitted to the segment decoder SD as described above.

The outputs from the modulo-20 counter CNT are also transmitted to a digit position selection decoder DDE which selects the digit places in the display circuits DISP1 and DISP2 to be displayed.

Next the mode of operation will be described in conjunction with the following multiplication:

$$123 \times 456 = \tag{1}$$

As with the conventional electronic calculators, in response to the depression of the numeral key KN, the central processing unit CPU fetches corresponding numeric data from the read-only memory ROM and stores it in a memory word with an address A in the random access memory RAM. Thereafter in response to the display instruction transmitted from the read-only memory ROM to the central processing unit CPU, WRITE signal is transmitted on a signal line R/W to a GATE AG5, and the central processing CPU transmits WRITE signal on a signal line DPL for displaying the contents of the random access memory RAM. The central processing unit CPU also transmits the contents of the memory word with the address A in the random access memory RAM not only to the memory DRAM through a signal line DL but also to gates AG3 and AG4 through a signal line ADL so that the contents of the memory word A is transmitted to the memory DRAM through GATES AG3, AG4 and AG5 to which is applied the signal on the signal line DPL. As a result, the numeric data on the signal line DL is stored in a numeric data section or memory location $\beta$ in the memory DRAM which is specified by the address transmitted.

Thereafter, the signal on the line DPL drops to a low level L, and the signal on the signal line R/W also drops to a low level L or becomes a readout signal so that an address signal derived from the counter CNT is transmitted through GATES AG1, AG2, OG1 and OG2 to the memory DRAM. Consequently, the contents of the memory words specified by the address signals are sequentially read out and transmitted to the segment decoder SD.

That is, when the "1" key KN is depressed, the corresponding coded signal is stored in the memory word with the address A in the memory RAM, and then into the least-significant position in the data section $\beta$. When the contents of the counter CNT becomes equal to the address of the memory word in which the coded signal corresponding to "1" is stored, the coded signal is converted into the segment signals by the segment decoder SD so that " 1 " is displayed on the display circuit DISP2.

More particularly, in response to the pulses from a pulse generator PG, the contents of the counter CNT is incremented and the counter CNT address sequentially from the contents associated with the least-significant position in the data section in the memory DRAM, and is transmitted to the decoder DDE so that the digit position to be displayed in the display circuit DISP1 or DISP2 may be specified. Therefore the output from the decoder DDE corresponds to the specified address in the memory DRAM and specifies the digit position to be displayed in the display circuit or DISP1 or DISP2. For instance, when the least significant digit position in the data section $\beta$ is specified, the least significant digit position in the display circuit DISP2 is specified. In like manner, the higher order digit positions are sequentially specified. When the most significant digit position of the data section $\beta$ or the display circuit DISP2, the digit positions in both the data section $\alpha$ and the display circuit DISP1 are specified in a manner substantially similar to that described above.

When the next digit key " 2 " is depressed, the corresponding coded signal is stored in the memory word with the address A in the memory RAM and then into the data section $\beta$ and is displayed in a manner substantially similar to that described above.

When the digit key " 3 " is depressed, the numeric data "1 2 3" is stored in the data section $\beta$ in the order named. The "0s" in the positions right to the most significant digit position are suppressed so that the sexadecimal digit "F" is fetched from the read-only memory ROM and is stored in the data section $\beta$ (See FIG. 3).

FIG. 4 shows various signal waveforms when the numeric data " 1 2 3 " is stored in the memory DRAM. The mode of operation will be further described in conjunction with these signal waveforms. When the numeric data " 1 2 3 " is stored in the memory ROM, the latter impresses the high-level display signal on the signal line DPL in order to display the contents of the memory word A in the memory RAM. It also causes the central processing unit CPU to develop the high-level signal on the signal line R/W. The central processing unit CPU also transmits the address signal through the address line ADL to the memory DRAM, and have access to the memory RAM so as to transmit the numeric data " 1 2 3 " through the signal or data line DL. Thus, first " 3 " is transmitted, and then " 2 " and " 1 " are transmitted in the order named. Finally, " F " is transmitted.

Thereafter the signal line DPL drops to a low level L so that the low-level signal or the readout signal is transmitted through gate AG5 to the memory DRAM. In response to the contents of the counter CNT which are transmitted through gates AG1, AG2, OG1 and OG2, the corresponding contents of the memory DRAM is specified and displayed as shown in FIG. 5(a).

Thereafter the operation or "multiplication" key is depressed. Then the central processing unit CPU deciphers the corresponding coded signal thus activated so that the "multiplication" instruction is stored in an operational instruction memory word with an address E in the memory RAM. Next in response to the control signal fetched from the memory ROM the data "1 2 3" stored in the memory word A is transferred into the numeric data memory word with an address B. Thereafter in accordance with the sequence of instructions fetched from the memory ROM the numeric data "1 2 3" stored in the numeric data memory word B is transferred into the numeric data section $\alpha$ in the memory DRAM in a manner substantially similar to that described above. In accordance with the sequence of instructions fetched from the memory ROM the multiplication instruction in the memory word E in the memory RAM is transferred into the most significant position of the data section $\beta$ in the memory DRAM. Thus the contents of the memory DRAM will be displayed as shown at (b) in FIG. 5 in response to the contents of the counter CNT.

In like manner, the next numeric data or the second operand "4 5 6" is entered and stored into the memory word with the address A in the memory RAM, and then transferred into the memory DRAM and displayed as shown at (c) in FIG. 5.

When the "equal" keys KE is depressed, the signal in turn consults with the contents of the operational instruction memory word E which is supposed to be done with the first and second operands "1 2 3" and "4 5 6". It acertains that the first and second operands are to be multiplied so that it fetches the "multiplication" sequence of instructions from the read-only memory ROM to obtain the product of the first and second operands or the contents of the memory words B and A. The result is stored in the memory word with an address D, and then is transferred into the memory word with the address A. Thereafter the result is further transferred into the data section $\alpha$ in the memory DRAM for display as shown at (d) in FIG. 5.

Next assume that after the numeric data "4 5 6" has been entered in the manner described above, instead of the "equal" key the "multiplication" key is depressed as shown in FIG. 6(d). Then the central processing unit CPU identifies whether or not the signal thus activated is the second operational instruction. That is, it has access to the memory word E to identify if any operational instruction is stored therein, and if it acertains that the first operational or "multiplications" instruction has been already stored in the memory word E, it stores the second operational or "multiplication " instruction into the memory word with an address F. Thereafter in response to the operational instruction stored in the memory word E, the first and second operands "1 2 3" and "4 5 6" are multiplied in a manner substantially similar to that described above when the "equal" key was depressed, and the contents of the memory word E is cleared and the contents of the memory word F is transferred into the memory word E. Next a third numeric data "7 8 9" is entered, stored first into the memory word A in the memory RAM and then transferred into the data section $\beta$ in the memory DRAM for display as shown in FIG. 6(e) in the manner described above.

When the "equal" key is depressed, the contents of the numeric data stored in the memory words A and B are multiplied as the "multiplication" instruction is stored in the memory E, and the result is stored in the memory word D. Thereafter the result or product is once transferred into the memory word A and then into the data section $\beta$ in the memory DRAM. It should be noted that the result or product is displayed in the lower row of the display device or panel as shown in FIG. 6(f) while the result when the "multiplication" key was depressed for the second time was displayed in the upper row. That is, the result when the "equal" key is depressed is displayed by the second display circuit DISP2.

As described above, according to the first embodiment of the present invention, the central processing unit CPU may discriminate an arithmetic operation to be executed in response to the depression of the operation or functional key from an arithmetic operation to be executed upon depression of the "equal" key, and may display the results on different display panels. Therefore the operator may easily discriminate a partial result (that is, a result at one step of the arithmetic operation sequence) from the total result (that is, the final result at the end of the arithmetic operation sequence). Furthermore the operands and an operator may be simultaneously displayed so that the manipulation of the electronic equipment or device may be much facilitated.

Second Embodiment, FIGS. 8 - 11

While the first embodiment described above with reference to FIGS. 1 - 7 has two display panels, the second embodiment to be described below with reference to FIGS. 8 - 11 is provided with three display panels for displaying a first operand, a second operand and a result.

Figures 6, 8:
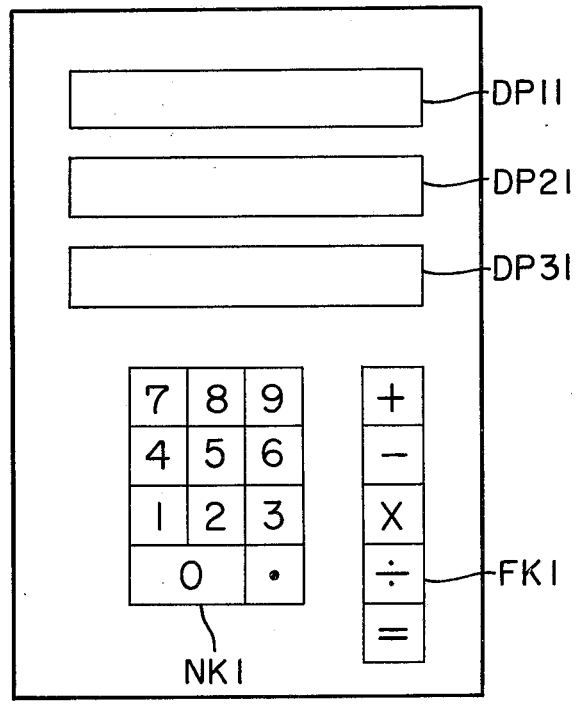
FIG. 6 is a table showing the relationship between the key operations and the resulting displays in a modification of the first embodiment.
FIG. 8 is a top view of a second embodiment of the present invention.
Figure 7:
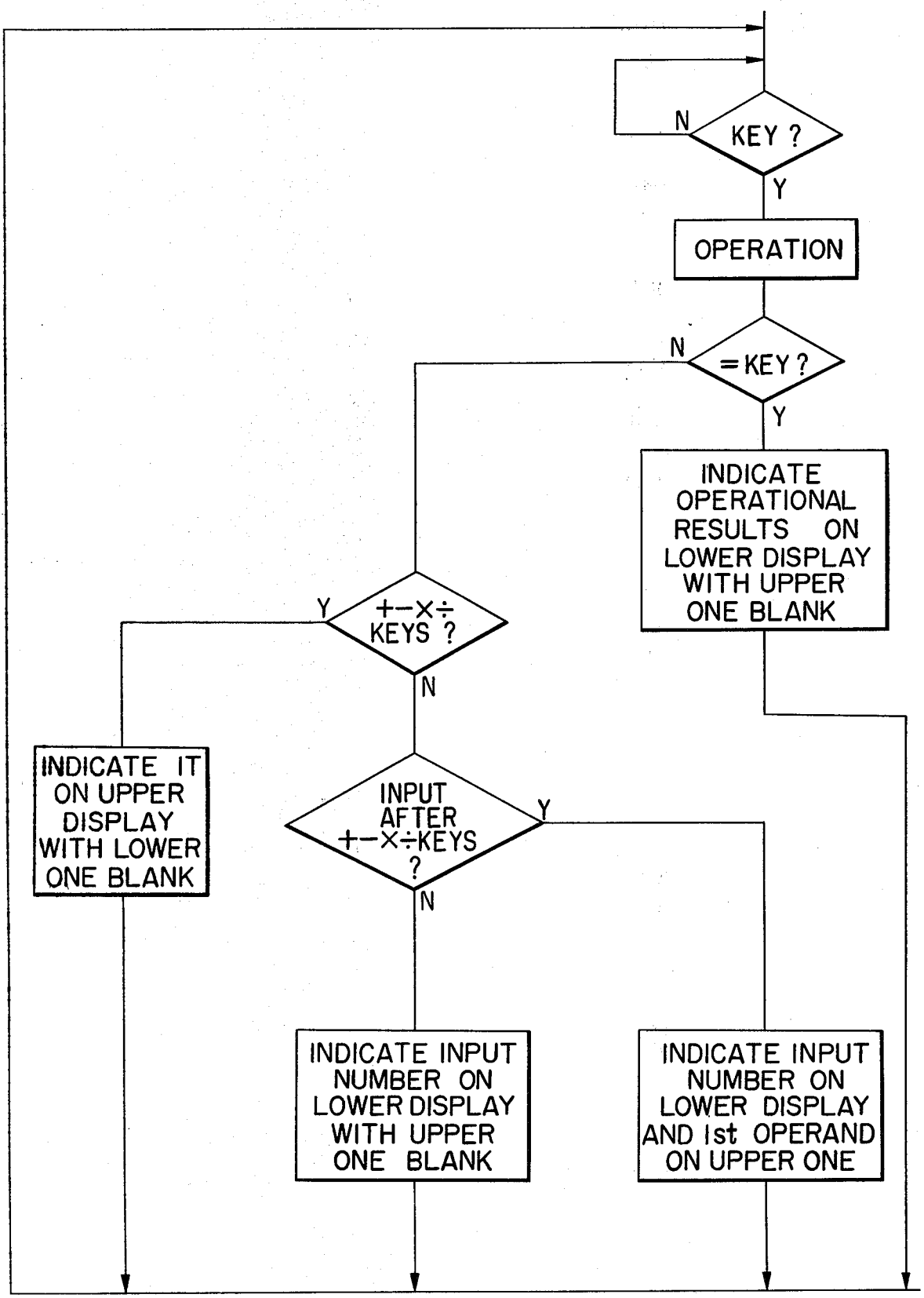
FIG. 7 is a flowchart used for the explanation of the mode of operation of the modification.

Referring first to FIG. 8, the second embodiment includes numeral or digit keys NK1 for entering numeric data and functional or operation keys FK1 for entering four arithmetic operational instructions. The operational instructions are in the form of a binary coded signal with the digit in a specified position being always logical "1". The second embodiment further includes first, second and third display panels DP11, DP21 and DP31 for displaying the operands, operator and result.

Figure 9:
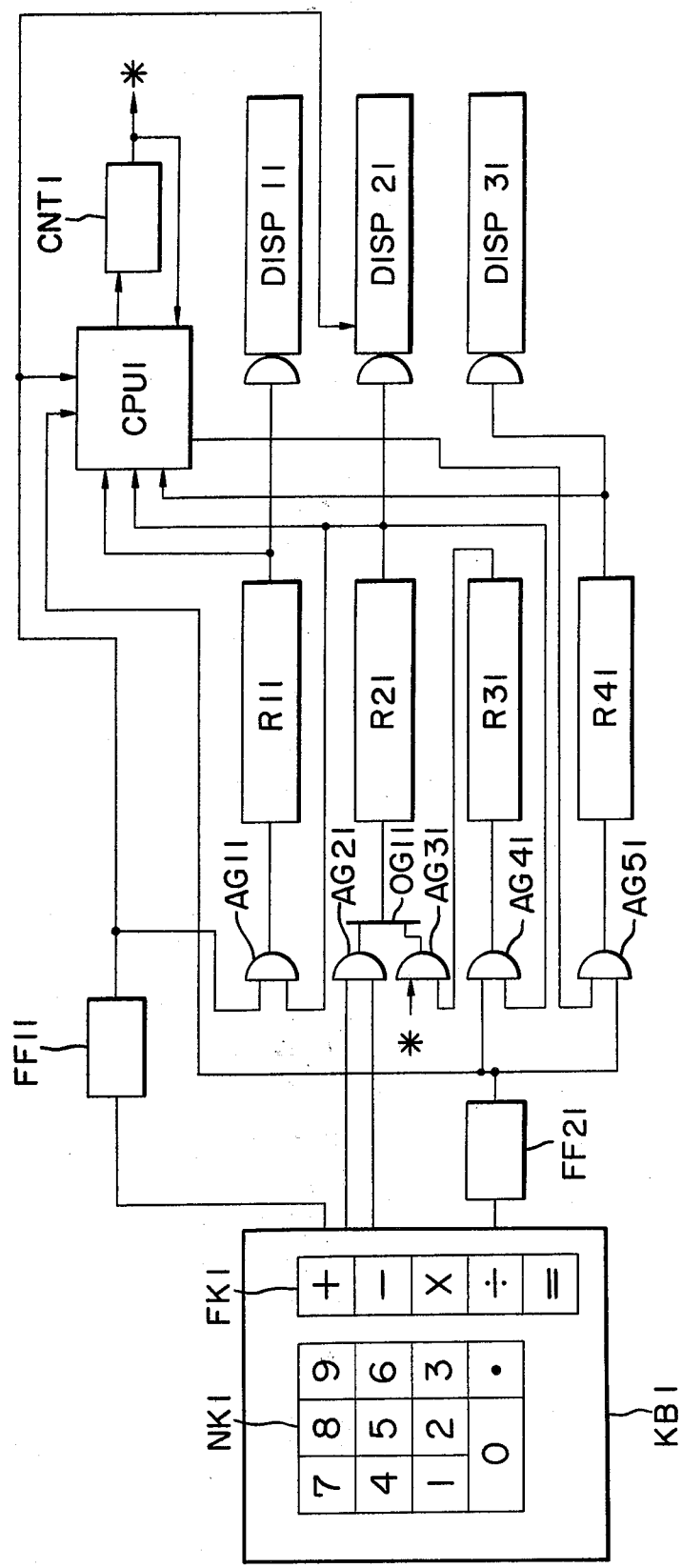
FIG. 9 is a schematic block diagram of the second embodiment.

In FIG. 9 there is shown a block diagram of the second embodiment. An input device is a keyboard KB1 with the digit keys NK1 and operation keys FK1. The numeric data entered by the keyboard KB1 are stored in respective registers R11, R21, R31 and R41. That is, a first operand transmitted from the input device or the keyboard KB1 is stored in the second register R21, and when a second operand is entered, it is stored in the second register R21 after the first operand in the second register R21 is transferred into the first register R11. The result of the operation between the first and second operands stored in the first and second registers R11 and R21, respectively, will be stored into the fourth register R41. The third register R31 is provided in order to maintain the second operand stored in the second register R21.

The signal activated by the depression of one of the four function keys "+", "−", "×" and "÷" is stored in a register or a flat FF11, and the signal activated by the depression of the "equal" key is stored in a register or flag FF21.

In response to the instruction stored in the first register or flag FF11, a central processing unit CPU1 executes an arithmetic operation between the first and second operands stored in the first and second registers R11 and R21 and stores the result in the register R41.

A counter CNT counts a pulse signal from the central processing unit CPU1 which is derived for every shift by one place of the data stored in the second register R21.

The contents of the first, second and fourth registers R11, R21 and R41 are displayed by display circuits DISP11, DISP21 and DISP31 which correspond, respectively, to the display panels DP11, DP21 and DP31 shown in FIG. 8.

Data or operands, operator and result are transferred into the registers R11 14 R41 through AND gates AG11 - AG51 and an OR gate OG11.

Next the mode of operation of the second embodiment with the above construction will be described in conjunction with a multiplication of $$123 \times 45 = \tag{2}$$

The first operand "1 2 3" is transmitted from the keyboard KB1 through AND gate AG21 and OR gate OG11 into the second register R21, and the contents of the register R21 is transferred into the display circuit DISP21 and is displayed as shown in FIG. 10(a). When the operation or "multiplication" key is depressed, the signal thus activated is stored in the first register or flag FF11. As described above, the digit at a specified position of the signal stored in the first flag FF11 is logical "1", and in response to this signal the contents of the second register R21 is transferred through AND gate AG11 into the first register R11. Thereafter the contents of the first register R11 is transmitted into the display circuit DISP11, and the data stored in the first register or flag FF11 is transmitted to the second display circuit DISP21 so that the first operand and the operator are displayed as shown in FIG. 10(b). (In response to the segment outputs, the specified segments of a seven-segment display unit are lighted to display a function or operation symbol such as "×", "+", "÷" and "−")

Next the second operand "45" is entered by the keyboard KB1, transmitted into the second register R21 through AND gate AG21 and OR gate OG1 and transmitted to the second display circuit DISP21. The data stored in the first register or flag FF11 is also transmitted to the display circuit DISP21. Thus the first and second operands as well as the operator "×" are displayed as shown in FIG. 10(c).

The signal activated by the depression of the "equal" key is stored in the second register or flag FF21, and the contents of the register R21 is transferred into the third register R31.

In response to the signal stored in the second register or flag FF21 as well as the contents or the multiplication command stored in the first register or flag FF11, the central processing unit CPU obtains the product of the first and second operands stored in the first and second registers R11 and R21, and transmits the result through AND gate AG51 into the fourth register R41. During the multiplication operation, the counter CNT is incremented by one for every shift to the right of the contents of the second register R21, and when the contents of the second shift register R21 returns to zero, the contents of the counter CNT also returns to zero so that a signal is applied to AND gate AG31 for transferring the contents of the third register R31 into the second register R21. Thus, the contents of the first, second and fourth registers R11, R21 and R41 are displayed by the first, second and third display circuits DISP11, DISP21 and DISP31, respectively, as shown in FIG. 10(d).

Figure 11:
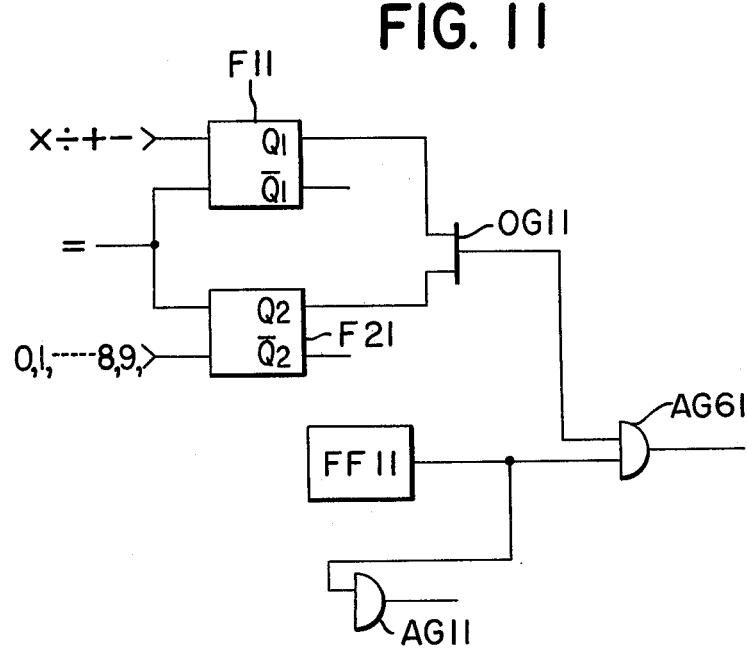
FIG. 11 is a block diagram of a modification of the second embodiment.

The displays as shown in FIGS. 10(c) and (d) may be effected by the addition of a circuit shown in FIG. 11 to the circuit shown in FIG. 9. The circuit shown in FIG. 11 is also capable of displaying a constant involved in an arithmetic operation.

Referring to FIG. 11, a flip-flop F11 is set in response to the depression of one of the four function keys "×, ÷, + and −", but is reset in response to the depression of the "equal" key. A flip-flop F21 is set in response to the depression of the "equal" key and is reset in response to the depression of one of the numeral of digit keys NK. The $Q_1$ output from the flip-flop F 11 and the $Q_2$ output from the flip-flop F21 are applied to an OR gate OG11, and the output from the OR gate OG11 is applied to AND gate AG61 so that the transmission of the contents of the first register or flag FF11 may be controlled.

Next the mode of operation of the circuit shown in FIG. 11 will be described. Upon depression of the "equal" key, the $Q_1$ output from the flip-flop F11 drops to a lower level L, and the $Q_2$ output from the flip-flop F21 rises to a high level H. As a result, the output from OR gate OG11 is at a high level H. As a consequence, the contents of the first register or flag FF11 is transmitted through AND gate AG61 into the second display circuit DISP21. Now assume that the multiplication of 123 × 32 is made. Then when the second operand "32" is entered and transmitted into the second register R21, the flip-flop F21 is reset so that the AND gate AG61 is closed and consequently the contents of the first register or flag FF11 is not transmitted into the second display circuit DISP21.

Upon depression of the "equal" key, the contents of the second register R21 is transferred into the third register R31 in the manner described above and the flip-flop F11 is set so that the contents of the first register or flag FF11 is transferred into the display circuit DISP21.

In response to the operational command stored in the first register or flag FF11, the central processing unit CPU1 obtains the product of the first and second operands stored in the first and second registers R11 and R22, respectively, and transmits the result into the fourth register R41. The contents of the registers R11, R21 and R41 are transmitted into the display circuits DISP11, DISP21 and DISP31 so that the contents of the first, second and fourth registers R11, R21 and R41 are displayed as shown in FIG. 10(f). Thus, the operator may distinctly see what operation and what result he has made.

When the operation key is depressed instead of the "equal" key in the step shown in FIG. 10(f), a new operational command is stored in the first register or flag FF11, the flip-flop F11 is set and the contents of the first register or flag FF11 is transmitted to the second display circuit DISP21 for display.

As described above according to the second embodiment of the present invention, the first and second operands as well as an operator may be displayed so that the operator may confirm respective steps of the arithmetic operation.

Third Embodiment, FIGS. 12 – 18

The third embodiment of the present invention to be described in detail hereinafter with reference to FIGS. 12 – 18 comprises a plurality of display means, memory means for storing numeric data, selection means for selecting the contents to be displayed by the plurality of display means and means responsive to the signal from the selection means for causing one of the plurality of display means to display contents fetched from the memory means and for causing another display means to display the contents which is normally displayed by the one display means.

Figure 12:
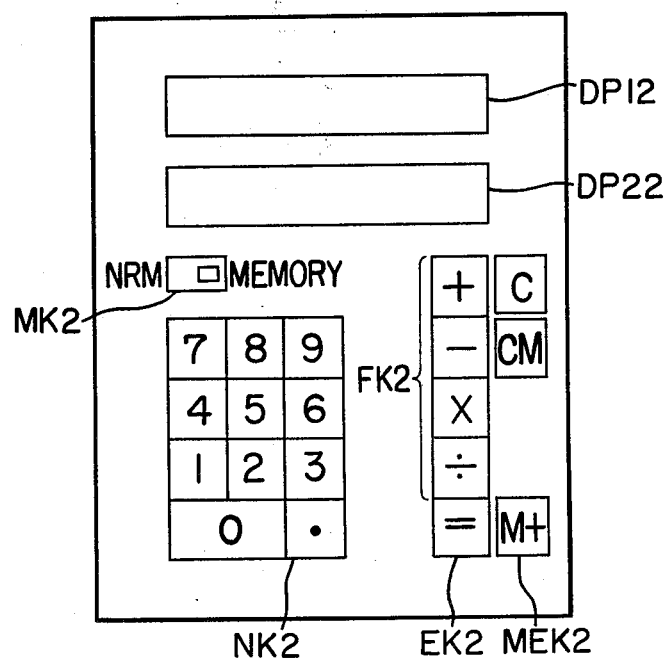
FIG. 12 is a top view of a third embodiment of the present invention.

First referring to FIG. 12, as with the first and second embodiments, the third embodiment includes a keyboard having digit keys NK2, functional or operation keys FK2, an operation execution or "equal" key EK2 and a key EMK2 MEK2 for adding numeric data which is being displayed to the contents of a memory, and a mode selection switch MK2.

Each of first and second display panels DP12 and DP22 consists of ten arrays of seven-segment display units for displaying entered numeric data and a result of the arithmetic operation thereof.

Figure 13:
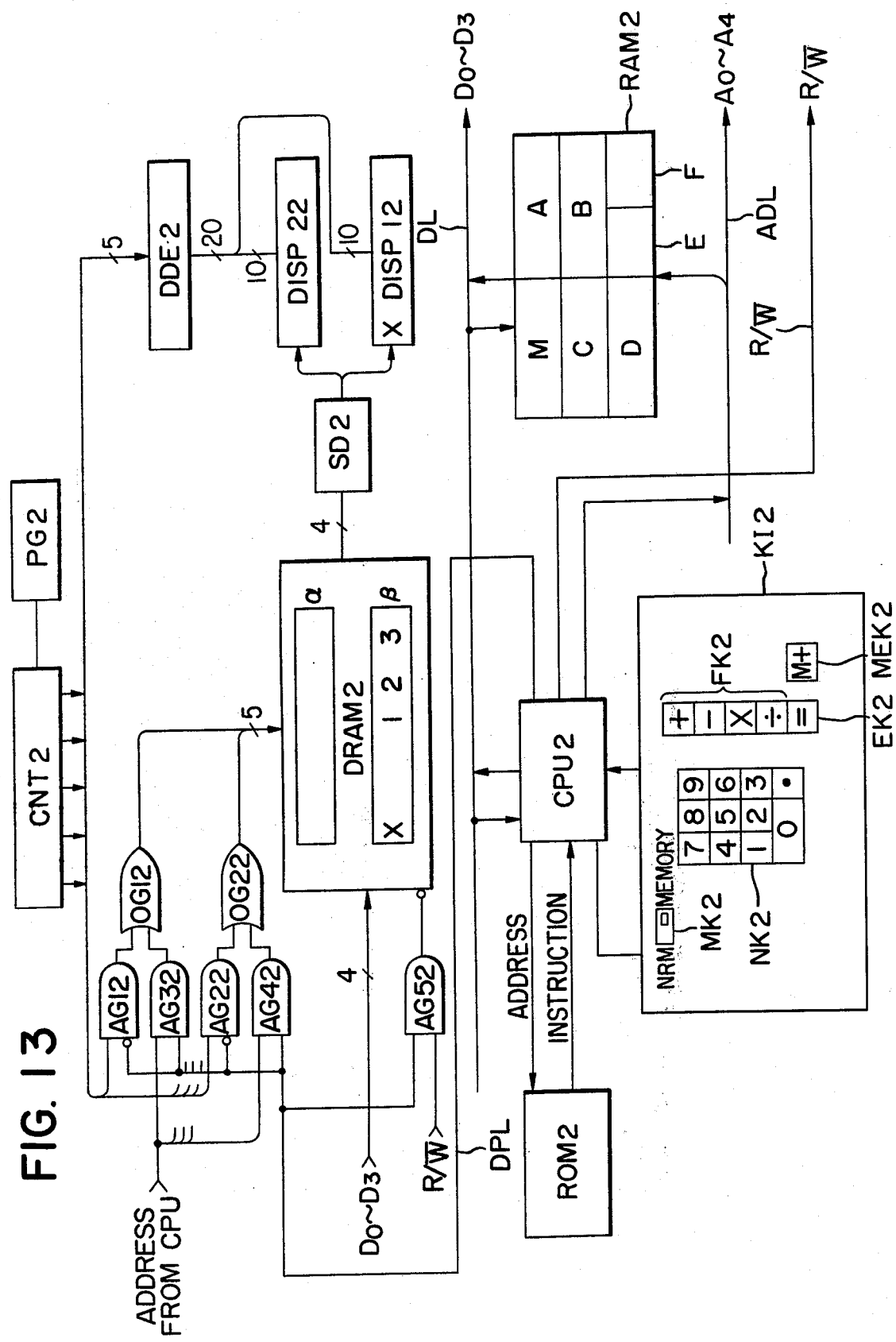
FIG. 13 is a schematic block diagram of the third embodiment.

In FIG. 13 there is shown a block diagram of the third embodiment. An input unit K12 is the keyboard of the type described above. A random access memory RAM2 has numeric data memory words or locations with addresses A, B, C, D and M and operational instruction or command memory words or locations E and F. First and second operands are stored in the numeric data memory words A and B, and the result of the arithmetic operation of these first and second operands is stored in the memory words C and D. A data which is required to be fetched out at any arbitrary time is stored in the memory word M. Operational commands or instructions are stored in the memory words E and F.

A read-only memory ROM2 stores input control instructions, arithmetic operation control instructions, data transfer instructions and other data.

In response to the signal from the input device K12 and the numeric data stored in the memory RAM, a central processing unit CPU2 fetches the corresponding instructions from the read-only memory ROM2.

Figures 14, 15:
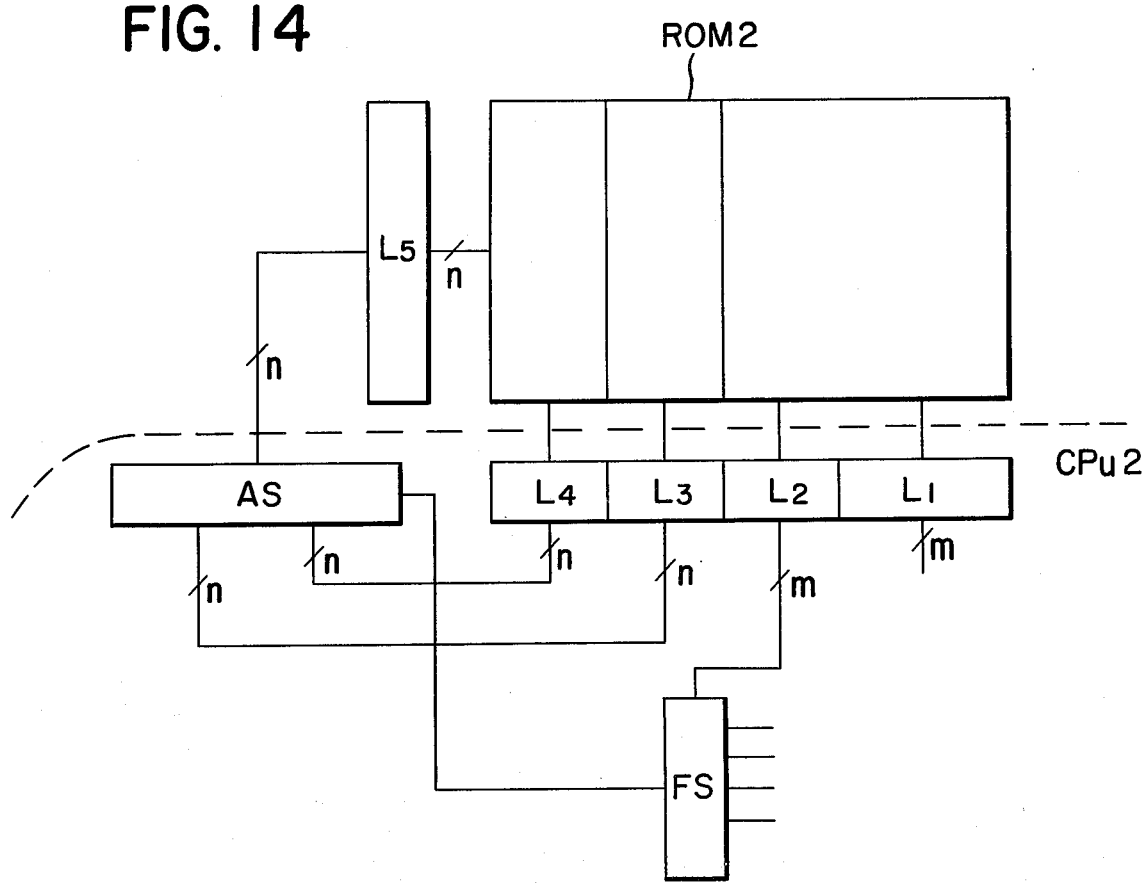
FIG. 14 is a schematic block diagram showing the interconnection between a central processing unit CPU2 and a read-only memory ROM2.
FIG. 15 is a table showing the relationship between the key operations and the resulting displays when a selection switch is set to "NORMAL"
Figure 18:
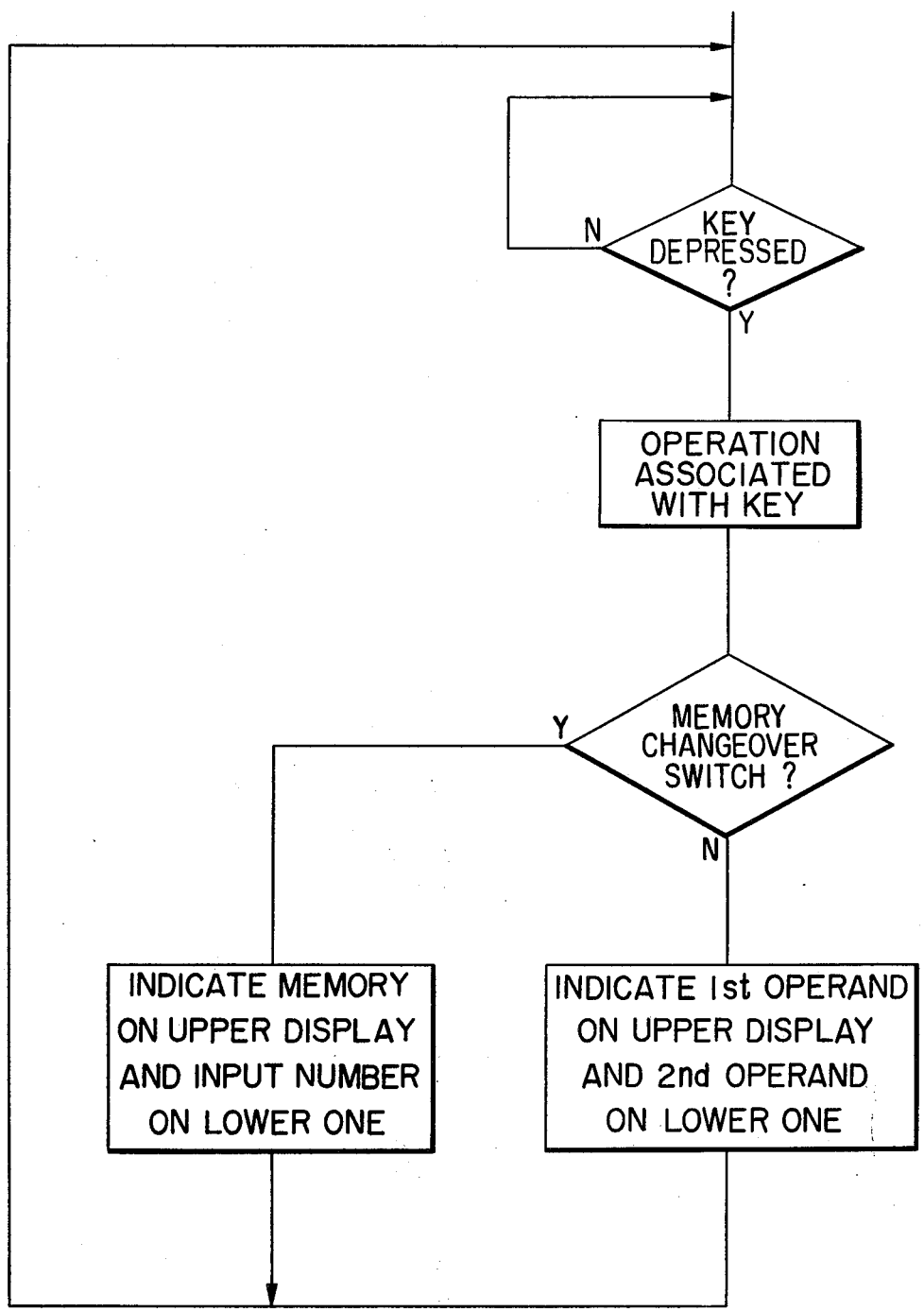
FIG. 18 is a flowchart used for the explanation of the mode of operations of the third embodiment.

In FIG. 14, there is shown an interconnection between the memory ROM2 and the central processing unit CPU2. The data fetched from the memory ROM2 is temporarily stored in a first latch circuit L1, and a signal for selecting a flag signal which is fetched out of the memory RAM2 is temporarily stored in a second latch circuit L2. In response to the contents of the second latch circuit L2, a flag selector FS selects one of flag signals applied thereto and transmits the selected flag signal to an address selector AS. Third and fourth latch circuit L3 and L4 fetch the next address signals from the memory ROM2 and transmit them to the address selector AS. That is, in response to the output from the flag selector FS, the address selector AS selects either of the contents of the third or fourth latch circuit L3 or L4, and transmits it to a fifth latch circuit L5 so as to have access to a desired address in the memory ROM2.

Referring back to FIG. 13, a display memory DRAM2 includes ten-digit data sections or registers α and β. In response to an address signal or the output or contents of a counter CNT2 which counts pulses from a pulse generator PG2, transmitted through AND gates AG12 and AG22 and OR gates OG12 and OG22 to the memory DRAM2, the contents thereof is transmitted to a segment decoder SD2 so that hexadecimal digits 0 through F may be displayed as shown in FIG. 3.

The output from the counter CNT2 is also transmitted to a digit selection decoder DDE2 which places its output on one of its 20 output lines.

Each of display circuits DISP12 and DISP22 consists of 10 arrays of display units, and in response to the output from the segment decoder SD2 and the output from the digit position selection decoder DDE2, a decimal digit is displayed in a selected position. The digit position selection decoder DDE2 is so arranged that when the least significant digit position in the data section β is selected or addressed in response to the contents of the counter CNT2, the digit position selection decoder DDE2 addresses or selects the least significant digit position in the first display circuit DISP12. As the higher order digit positions are accessed in the data section β, the higher order digit positions are selected accordingly in the first display circuit DISP12. When the required display units in the selected digit positions in the first display circuit DISP12 are lighted up in the manner described above, the second display circuit DISP22 and the data section α are selected. That is, an address signal which is transmitted on an address line ADL from the central processing unit CPU and is applied to AND gates AG32 and AG42 is transmitted to the memory DRAM2 when a display signal is transmitted from the central processing unit CPU through a display or signal line DPL to the AND gates AG32 and AG42. Thereafter the central processing unit CPU2 fetches the numeric data from the memory RAM2 and transmits it to the memory DRAM2. When a signal which is transmitted from the central processing unit CPU through a signal line R/W̄ to AND gate AG52 rises to a high level H, the numeric data is loaded into the memory DRAM2. When the signal on the signal line R/W̄ drops to a low level L, the contents of the memory word in the DRAM2 addressed by the address signal from the counter CNT is displayed.

Next the mode of operation of the third embodiment with the above construction will be described in more detail hereinafter. The numeric data or the like to be displayed by the display panels DP12 and DP22 may be changed by the mode selection switch MK2. That is, when the mode switch MK2 is set to NRM (normal), the first and second operands, an operator and the result are displayed on the first and second display panels DP11 and DP21 as shown in FIG. 15 as will be described in detail hereinafter.

First, the first operand "123" is entered and stored in the memory word with the address A in the memory RAM2. Thereafter the central processing unit CPU2 fetches the contents "123" of the memory word A and transmits it to the data section β in the DRAM2. Thereafter in response to the contents of the counter CNT the contents of the data section β are displayed in the manner described above.

Next the operation or "multiplication" key FK2 is depressed, and the central processing unit CPU2 deciphers the signal thus activated and stores the "multiplication" instruction into the memory word E in the random access memory RAM2. Thereafter the data "1 2 3" stored in the memory word A in the memory RAM2 is transferred into the memory word B, and thereafter it is transmitted to the data section α in the DRAM2. These steps are carried out in accordance of the sequence of instruction fetched by the central processing unit CPU2 from the read-only memory ROM. When the contents "1 2 3" has been stored in the data section α in the manner described, the contents of the data section β is erased so that the first operand "1 2 3" is displayed as shown in FIG. 15(b).

When the second operand "4 5 6" is entered, the central processing unit CPU2 consults with the contents of the memory word E in the RAM2, and ascertains that the first and second operands "123" and "456" are to be multiplied. While the central processing unit CPU2 is fetching the required instructions from the read-only memory ROM2, the second operand "456" is stored in the memory word A in the memory RAM2. Thereafter the data "456" in the memory word A is transmitted to the data section β in the DRAM2 so that the first operand "1 2 3" and the second operand "456" are displayed as shown in FIG. 15 (c).

Next the mode of operation when the mode selection switch MK2 is set to "MEMORY" will be described. It is assumed that the electronic equipment be cleared. When for instance a numeric data "1 2 3 4 5 6" is entered, the central processing unit CPU2 consults with the contents of the memory words E and F in the memory RAM2 and with the conditions with the central processing unit CPU2 itself, and identifies that the numeric data "123456" is the first operand. Therefore the central processing unit CPU2 stores it into the memory word A in the memory RAM2, and thereafter transmits it to the data section β in the DRAM2 so as to be displayed by the second display circuit DISP22.

When the "memory" key MEK2 is depressed in order to store the numeric data "123456" into the memory word M in the memory RAM2, the central processing unit CPU2 fetches a series of instructions from the memory ROM2 for adding the data "123456" stored in the memory word A in the RAM2 to the contents of the memory word M and storing the sum into the memory word M. Since the contents of the memory word M is "0", the result is that the data "123456" in the memory word A is transferred into the memory word M. (See FIG. 18)

The next step is to identify whether the mode selection switch MK2 is set to "NORMAL" or "MEMORY". Since the mode selection switch MK2 has been set to "MEMORY", the central processing unit CPU2 fetches from the memory ROM2 a series of instructions for transmitting the data "123456" in the memory word M in the memory RAM2 into the data section α in the DRAM2 so that the numeric data "123456" is displayed by the second display circuit DISP22 on the upper display panel.

Next assume that the product of "123" and "456" be obtained and added to the data "123456" in the memory word M in the memory RAM2. First, a clear key "C" is depressed to erase the contents of the memory word M in tne memory RAM2. The contents of the data section α in the memory DRAM2 is also erased, but is refreshed during the step for identifying whether the mode selection switch is set to "NORMAL" or "MEMORY". That is, the contents of the data section α remains unchanged.

Thereafter the numeric data or first operand "123" is entered and stored in the memory word A and thereafter transmitted to the data section β in the DRAM2.

The mode of loading the numeric data "123" into the memory DRAM2 will be described in detail with reference to FIG. 16 showing various signal waveforms. The central processing unit CPU2 places a high level signal H on the signal line DPL when the numeric data "123" is loaded into the memory DRAM2, and transmits the address signals $A_0 - A_4$ for identifying the address of the memory location through AND gates AG32 and AG42 to the memory DRAM2. Next the central processing unit CPU2 transmits a high-level D signal through the signal line R/W̄ to AND gate AG52. Thus the numeric data "123" is stored in the addressed memory location in the memory DRAM2 so that the previously stored numeric data "123456" and the newly entered numeric data "123" are displayed as shown in FIG. 17(a).

When the "multiplication" key is depressed, the central processing unit CPU2 stores the "multiplication" instruction into the memory word E in the memory RAM2 and then transmits the contents of the memory word A to the memory word B in the memory RAM2 in accordance with a sequence of instruction fetched out of the memory ROM2. At this step, the numeric data are displayed as shown in FIG. 17(b).

In the NORMAL mode of contents of the memory word A would be transferred to the memory word B.

When the second operand "45638 is entered, the memory word M in the memory RAM2 is cleared and the numeric data "456" is stored therein. The numeric data are displayed as shown in FIG. 17(c).

When the "equal" key is depressed, the central processing unit CPU2 consults with the contents of the memory word E in the memory RAM2 and carries out the multiplication of the first operand "123" and the second operand "456". During the multiplication, the partial result or product is once stored in the memory word C, and the total product is stored in the memory word D and then into the memory word B so that the result "56088" is displayed on the lower display panel as shown in FIG. 17(d).

When the "memory" key MEK2 is depressed in order to add the result "56088" to the previously stored numeric data "123456", the central processing unit CPU fetches a series of instructions required from the read-only memory ROM2 and adds the data "56088" in the memory word D to the data "123456" in the memory word M and stores the sum "179544" into the memory word M. Thereafter the central processing unit CPU2 transmits the contents "179544" of the word memory M in the memory RAM2 into the numeric data memory location a in the DRAM2 and is displayed in the manner described above as shown in FIG. 17(e).

According to the third embodiment, contents of a memory storing temporarily a numeric data may be displayed. That is, the contents of the memory word M and its change may be displayed. In order to positively indicate that the numeric data being displayed is the contents of the memory word M, a suitable symbole such as "M" may be displayed at the position right to the most significant digit of the numeric data. Even though the so-called independent display panel used exclusively for displaying the contents of the memory word M, the third embodiment of the present invention is provided with display selection means or the mode-selection switch so that one display panel may be selectively used for displaying either of a first operand or contents of the memory word M in the random access memory RAM2. Thus the step for confirming the input data may be eliminated.

Fourth Embodiment, FIGS. 19 – 24

Figure 19:
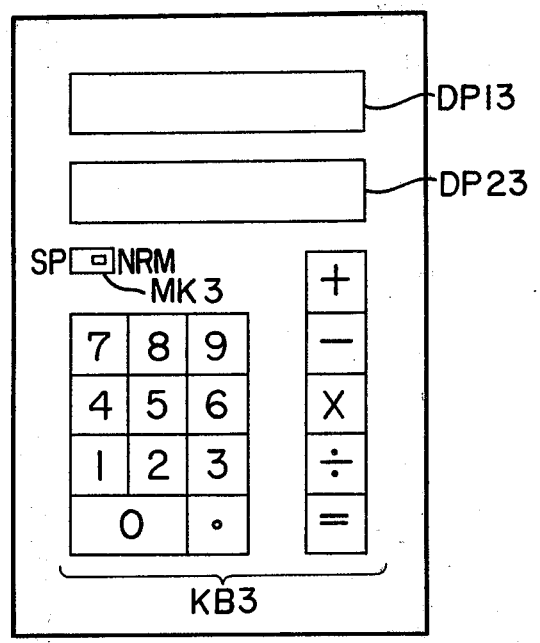
FIG. 19 is a top view of a fourth embodiment of the present invention.

First referring to FIG. 19, the fourth embodiment includes a main display panel DP13 and an auxiliary display panel DP23 which are arranged in parallel with each other and spaced apart from each other by such a distance that the user may clearly distinguish the numeric data displayed on the main display panel DP13 from that on the auxiliary display panel DP23. The purposes of the main and auxiliary display panels DP13 and DP23 will become apparent from the following description of the fourth embodiment taken in conjunction with FIGS. 20–24. The fourth embodiment further includes a selection switch MK3 for selecting either the main display panel DP13 or the auxiliary display panel DP23 for the purposes to be described hereinafter, and a keyboard KB3 with digit keys and operation keys.

Figure 20:
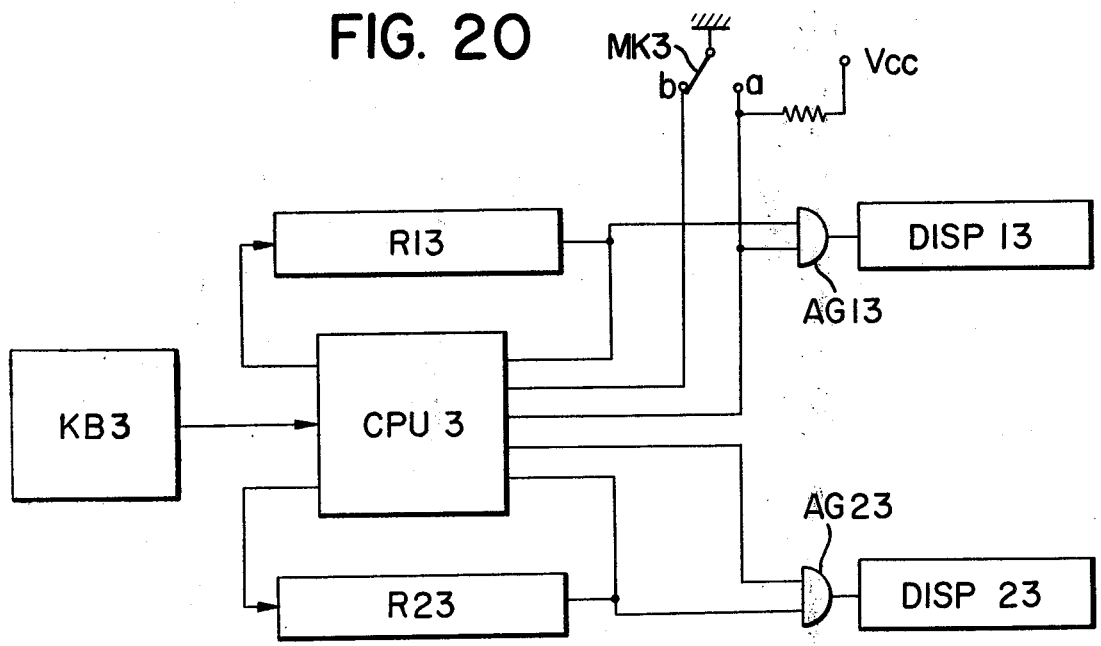
FIG. 20 is a schematic block diagram of the fourth embodiment.

In FIG. 20 there is shown a block diagram of the fourth embodiment. A numeric data entered from the keyboard KB3 is transmitted to a central processing unit CPU3 and then stored in either an operation or a memory register R13 or R23. The contents of the operation register R13 is transmitted through an AND gate AG13 to a main display circuit DISP13 so that the entered numeric data may be displayed on the main display panel DP13.

The contents of the memory register R23 is transmitted through an AND gate AG23 to an auxiliary display circuit DISP23 so that the contents may be displayed on the auxiliary display panel DP23.

The AND gates AG13 and AG23 are controlled by the display selection switch MK3. That is, when a main stationary contact a is closed, a low-level signal is applied to the AND gate AG13 so that the latter remains closed and consequently the contents of the operation register R13 is not displayed.

Next the mode of operation of the fourth embodiment with the above construction will be described in conjunction with the following addition:

$$123 + 456 \qquad (4)$$

It is assumed that the selection switch MK3 is set to NORMAL so that the auxiliary stationary contact b is closed and the central processing unit CPU3 identifies this NORMAL mode.

When the numeric data or the first operand "123" is entered, it is stored in the memory register R23, and in response to a display control signal from the central processing unit CPU3 it is transmitted to the auxiliary display circuit DISP23 so that it is displayed as shown in FIG. 21(a).

When the "addition" key is depressed, the central processing unit CPU3 deciphers the signal thus activated and transfers the contents of the memory register R23 into the operation register R13, but the data "123" remains in the memory register R23. Applied to the AND gate AG23 as a display control signal is the output from a NAND gate to which are applied the signal from the main stationary contact a of the selection switch MK3 and the output from a flip-flop which is driven into the set state upon depression of one of the operation keys but is driven into the reset state upon depression of one of the numeric or digit keys. Thus when the "add" key is depressed, the transmission of the contents "123" of the memory register R23 is interrupted by the AND gate AG23 so that the first operand "123" and the operator " + " are displayed as shown in FIG. 21(b).

When the next numeric data or a second operand "456" is entered, the central processing unit CPU3 identifies this as an numeric data entered after the "add" key has depressed, and causes both the memory register R23 and said flip-flop to be cleared so that the second operand "456" is stored in the memory register R23. At this step, the first and second operands "123" and "456" and the operator " + " are displayed at (c) in FIG. 21.

Figure 21:
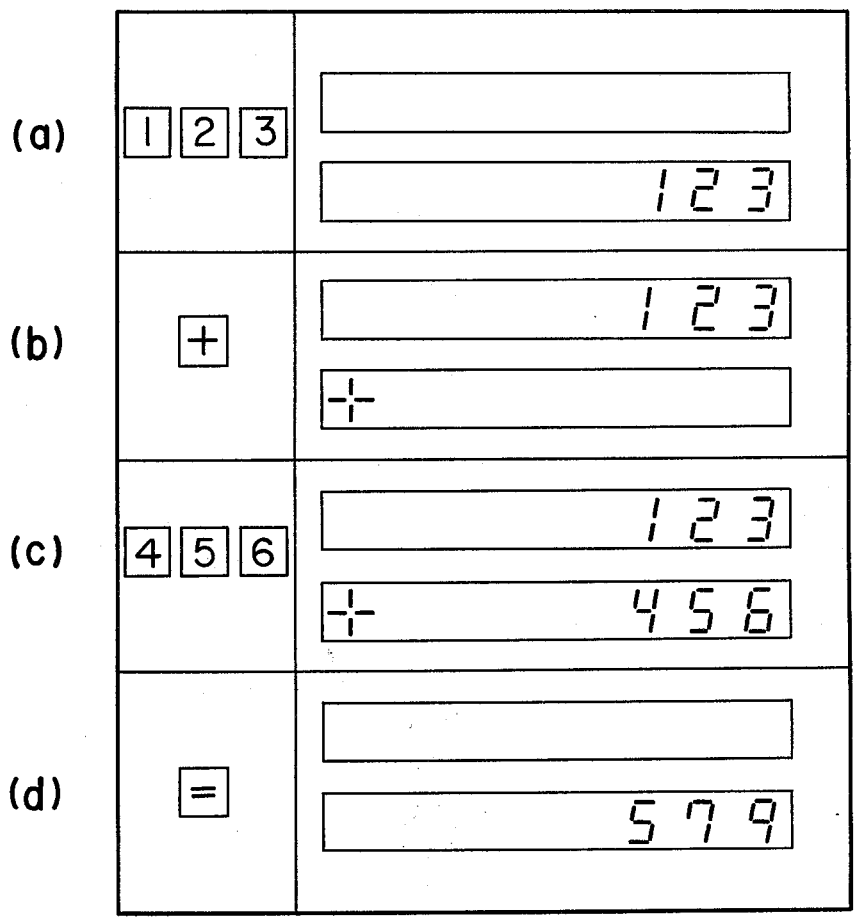
FIGS. 21 and 22 are tables showing the relationship between the key operations and the resulting displays.
Figure 22:
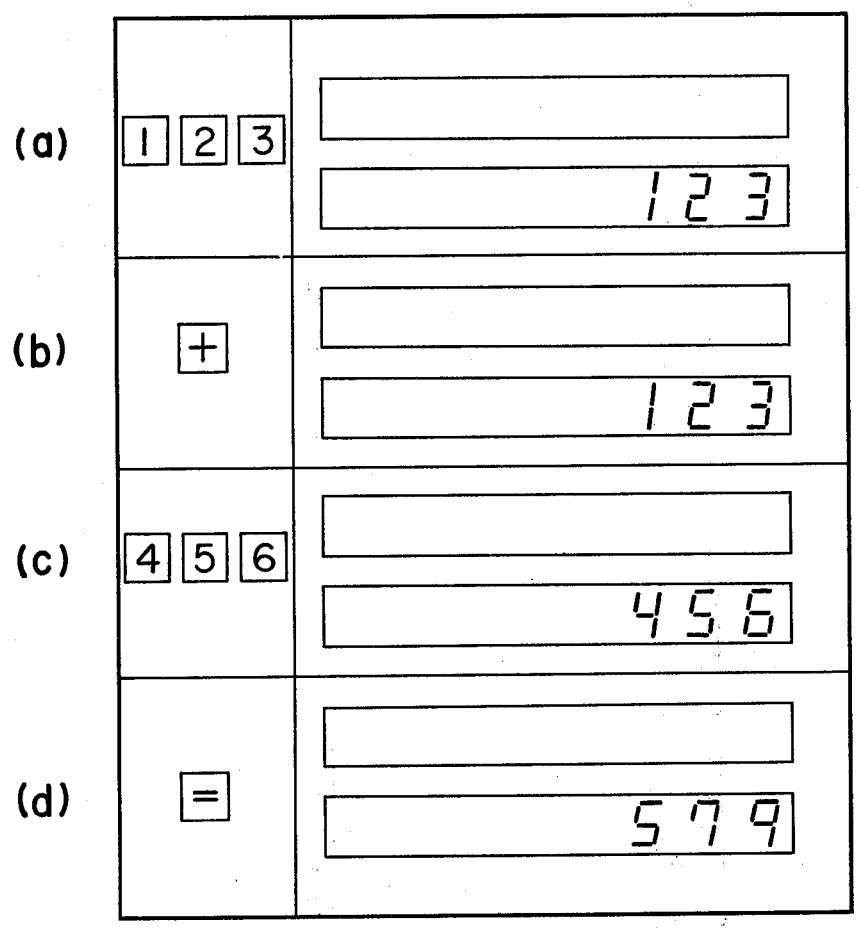

Next the "equal" key is depressed. Then the contents "123" of the operation register R13 and the contents "456" of the memory register R23 are added according to a preset sequence of instructions fetched by the central processing unit CPU3, and the result or sum "579"

is stored in the memory register R23 and is displayed as shown at (d) in FIG. 21.

Next the mode of operation when the selection switch MK3 is set to SP will be described. When the selection switch MK3 is set to SP, the main stationary contact a thereof is grounded or at a low level so that AND gate AG13 is closed and consequently no numeric data is displayed on the main display panel DP13. The central processing unit CPU3 identifies that the selection switch MK3 has been set to SP in response to a signal transmitted thereto through a signal line.

Now assume that the sum of "123" and "456" is to be obtained. When the first operand "123" is entered, it is stored in the memory register R23 as in the "NORMAL" mode and is displayed on the auxiliary display panel DP23.

Next when the "addition" key is depressed, the flip-flop is driven to the set state, and the set output signal is applied to one input terminal of the NAND gate. The low-level signal from the main stationary contact a of the selection switch MK3 is applied to the other input terminal of the NAND gate so that a high-level signal is applied to one input terminal of the AND gate AG23. As a result, even when the "add" key is depressed, the contents "123" of the memory register R23 is displayed on the auxiliary display panel DP23 as shown at (b) in FIG. 22. At this step the contents of the memory register R23 has been of course transmitted to the operation register R13.

When the second operation "456" is entered, the flip-flop is driven into the reset state so that a high-level output is derived from the NAND gate. The central processing unit CPU3 identifies that the second operand "456" is a numeric data which has been entered after the "add" key was depressed, and causes the memory register R23 to clear and stores the second operand "456" therein. At this step, the second operand only is displayed as shown at (c) in FIG. 22.

Next when the "equal" key is depressed, the central processing unit CPU3 executes the addition of the first and second operands "123" and "456" in accordance with a sequence of instructions previously stored in the central processing unit CPU3, and stores the sum "579" into the memory register R23. Thereafter the central processing unit CPU3 transmits the contents "579" of the memory register R23 through AND gate AG23 into the auxiliary display circuit DISP23 so that the sum "579" is displayed on the auxiliary display panel as as shown at (d) in FIG. 22.

Since the fourth embodiment is provided with display mode selection means or selection switch MK3, the operator may use only the auxiliary display panel DP23 when he has noticed that the numeric data display on the main display panel DP13 is dim. As a result, the power consumption may be minimized and consequently the voltage drop of the power source may be avoided or retarded and will not adversely affect the arithmetic operations.

FIRST MODIFICATION, FIG. 23

Figure 23:
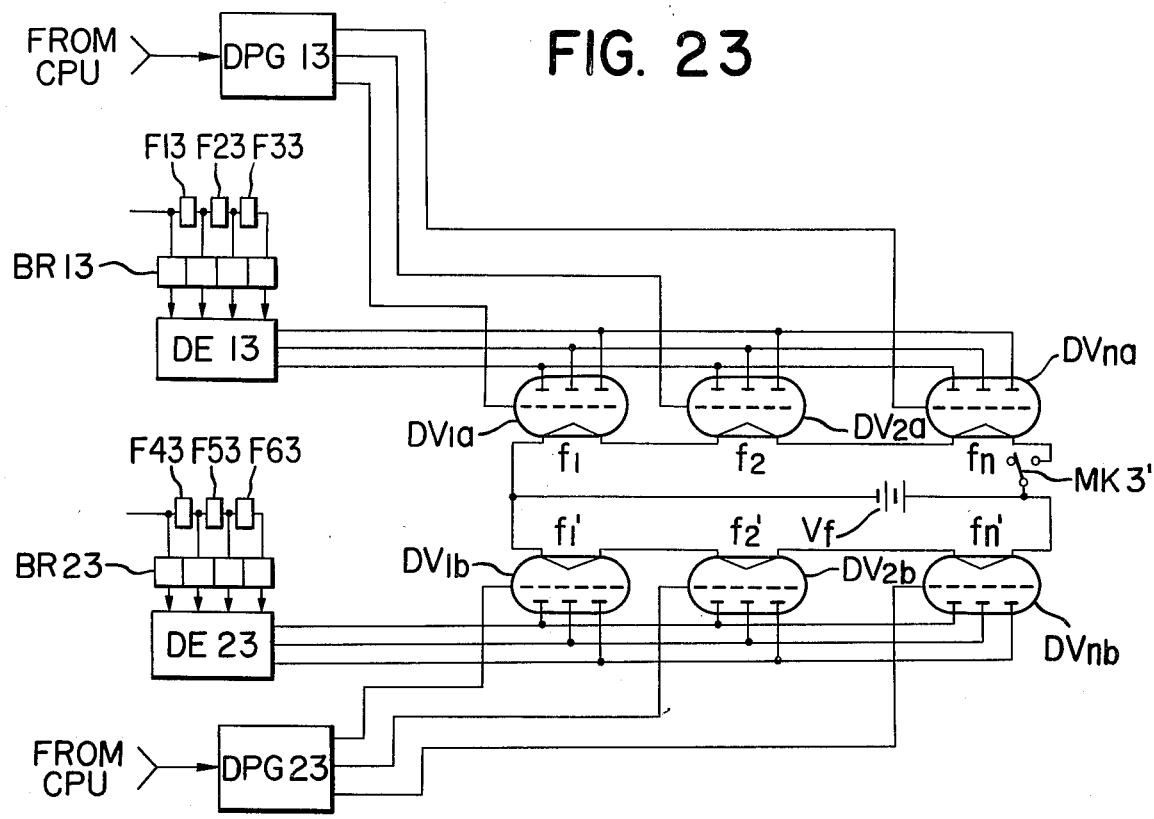
FIGS. 23 and 24 are circuit diagrams, respectively, of first and second modifications of the fourth embodiment.

Referring to FIG. 23, the first modification of the fourth embodiment will be described. Flip-flops F13, F23 and F33 convert the serial output from the operation register R13 into parallel outputs which are transmitted to a buffer register BR13. In like manner, flip-flops F43, F53 and F63 convert the serial output from the memory register R23 into parallel outputs which in turn are loaded into a buffer register BR23. The contents of the buffer registers BR13 and BR23 are transmitted to segment decoders DE13 and DE23, respectively, and the outputs from the segment decoder DE13 are transmitted to display elements DV1a, DV2a, . . . , and DVna while the outputs from the segment decoder DE23, to display elements DV1b, DV2b, . . . , and DVnb. Pulses from digit position pulse generators DPG1 and DPG2 are also applied to these display elements Vna and Vnb (where n is an integer) so that the decimal digits may be displayed in a manner well known in the art. Filaments f1, f2, . . . , and fn of the display elements V1a, V2a, . . . , and Vna and filaments f1, f2, . . . , and fn of the display elements V1b, V2b, . . . , and Vnb are connected to a power supply VF.

A switch MK3' is ganged with the selection switch MK3 and is opened to disconnect the power supply VF from the filaments f1, f2, . . . , and fn of the display elements V1a, V2a, . . . , and Vna so that the latter will not display any numeric data. As a result, the power consumption may be minimized and consequently the electronic device may operate for a longer period of time.

Figure 24:
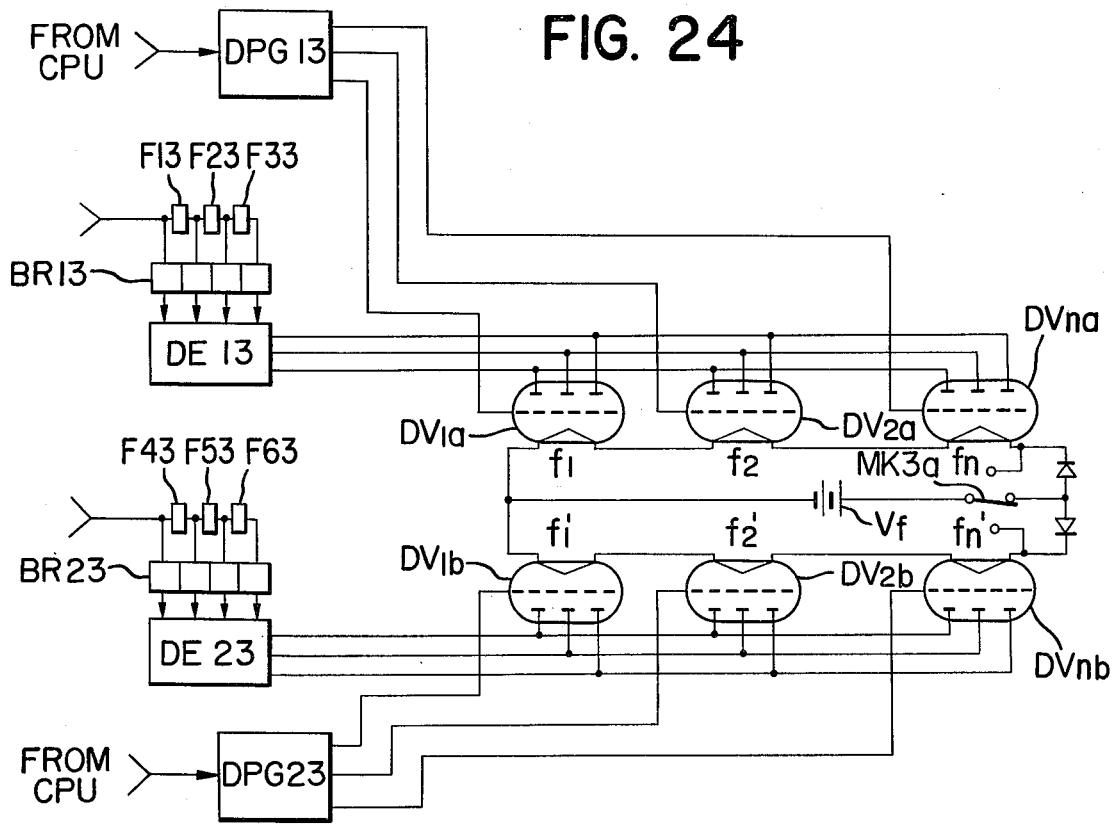

Second Modification, FIG. 24

The second modification of the fourth embodiment or an improvement of the first modification shown in FIG. 23 will be described with reference to FIG. 24. The second modification is substantially similar in construction to the first modification except that instead of the single pole, single throw switch MK3, a switch MK3a with a single movable contact and three stationary contact is used so that the filaments of both the display elements V1a, V2a, . . . , and Vna and V1b, V2b, . . . , and Vnb may be disconnected from the power supply VF.

As an alternative of the first and second modifications, the display elements may be so arranged as to be normally completely disconnected from the power supply VF and connected thereto only when the operator wants to see the operation result.

Fifth Embodiment, FIGS. 25 – 29

The essential feature of the fifth embodiment of the present invention to be described in detail with reference to FIGS. 25 – 29 resides in the fact that the number of steps completed of a sequence of successive arithmetic operations may be displayed as will become apparent from the following description.

Figures 25, 27:
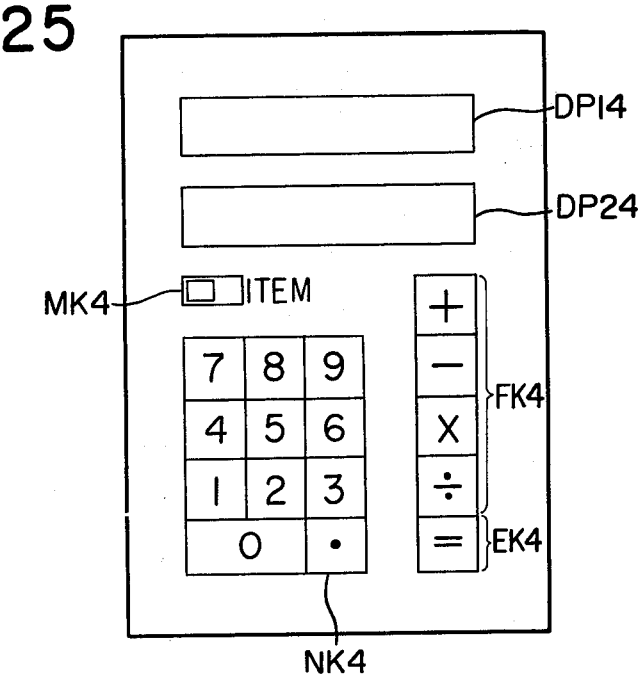
FIG. 25 is a top view of a fifth embodiment of the present invention.
FIG. 27 is a table showing the relationship between the key operations and the resulting displays in the fifth embodiment.
Figure 28:
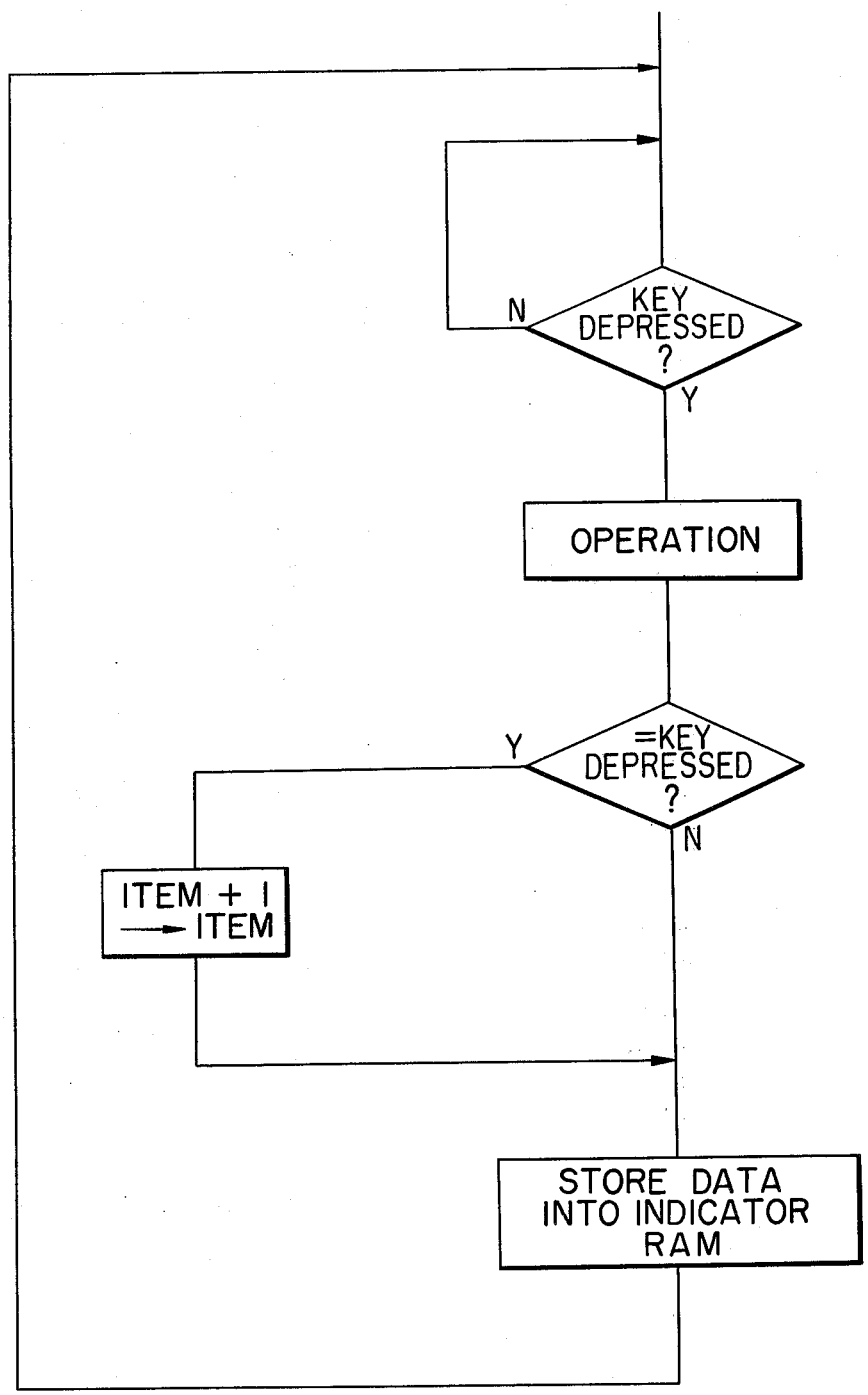
FIG. 28 is a flowchart used for the explanation of the mode of operations of the fifth embodiment.

First referring to FIG. 25, the fifth embodiment includes a first display panel DP14, a second display panel DP24, digit keys NK4, functional or operation keys FK4, an "equal" key EK4 and an "ITEM" switch MK4. As will be described in detail hereinafter, when the switch MK4 is set to "ITEM", the number of steps completed of a sequence of successive arithmetic operations will be displayed on the first display panel DP14.

In FIG. 26, there is shown a block diagram of the fifth embodiment. An input unit KI4 includes the digit keys FK4, operation keys FK4, the "equal" key EK4 and the item switch MK4.

A read-only memory ROM4 stores therein various sequences of instructions and data required for executing the various arithmetic operations, and these sequences of instructions and data are fetched by a central processing unit CPU4 by addressing the first address of respective sequence of instructions and data.

A random access memory RAM4 stores therein the numeric data or operands entered from the input unit KI4, operational instructions, the number of steps completed of a sequence of successive arithmetic operations, the conditions or states of various associated components and so on, and they are loaded into or fetched from the memory words or locations addressed by the central processing unit CPU4 in a manner well known in the art.

The central processing unit CPU4 is responsive to the input signal from the input unit KI4 and/or the data stored in the random access memory RAM4 for fetching a required sequence of instructions and data from the read-only memory ROM4 in the manner described above so that the data stored in the random access memory RAM4 may be processed and the data to be displayed on the display panels DP14 and DP24 may be transferred into a display memory DRAM4.

The memory DRAM4 has 20 arrays of memory words or locations each for storing one binary-coded or otherwise coded decimal digit. The contents or the outputs from a modulo-20 counter CNT4 are transmitted in parallel as address signals through AND gates AG14 and AG24 and OR gates OG14 and OG24 to the memory DRAM4. The contents of the addressed memory word is transmitted to a segment decoder SD4 so that it may be displayed on either of a display circuit DISP14 or DISP24.

The output from the modulo-20 counter CNT Is also transmitted to a digit position selection decoder DDE4, and the output from the decoder DDE4 is applied to the display circuits DISP14 and DISP24. Therefore the contents of the addressed memory word in the memory DRAM4 is displayed by a display element in the display circuit DISP14 or DISP24 addressed by the digit position selection decoder DDE4 in the manner well known in the art.

In the fifth embodiment, the memory words in the memory DRAM4 are equally divided into two sections α and β. In response to the counts in the modulo-20 counter CNT, the contents of the memory are sequentially read or fetched out from the least significant memory word to the higher order memory words of the section β. After the contents of the most significant memory word in the data section β having been read out, the contents of the data section α are read out sequentially from the least significant word of memory to the higher order memory word. The data thus read out is transmitted to the segment decoder SD4, and the output from the segment decoder SD4 is transmitted to the display circuit DISP14 or DISP24. In response to the counts in the modulo-20 counter CNT the decoder DDE4 produces a signal in response to which the display element in the least significant digit position in the display circuit DISP14 may be selected when the contents of the memory word in the least significant digit position in the data section β is read out. Thus the display elements in the display circuits DISP14 and DISP24 may be selected in a manner substantially similar to that for accessing the memory words in the memory DRAM4.

A control signal is transmitted through a signal line DPL from the central processing unit CPU4 to one input of each of AND gates AG34 and AG44. The control processing unit CPU4 also transmits address control signals through address lines $A_0$ - $A_4$ to the other inputs of AND gates AG34 and AG44 for identifying the address of a memory word in the memory DRAM4 which is loaded with contents of an addressed memory word in the memory RAM4.

The transfer through a data line or bus DL of the contents of the address memory word in the memory RAM4 into the addressed memory word in the DRAM4 is controlled by the AND gate AG54. That is, if and only if the control signal transmitted through the signal line DPL and a high-level signal H transmitted through a signal line $\overline{R/W}$ are simultaneously applied to the AND gate AG54, the memory DRAM4 is loaded with the contents of the memory RAM4.

The modulo-20 counter CNT counts pulses from a pulse generator PG4. The output of the pulse generator PG4 is connected to the input of the modulo-20 counter CNT.

Next the mode of operation of the fifth embodiment with the above construction will be described. It is assumed that the key MK4 (See FIG. 25) is set to "ITEM" and that the central processing unit CPU4 identifies this condition.

Assume that the digit keys "1", "2" and "3" are depressed in the order named. Then the central processing units CPU4 identifies that these digit keys have been depressed, and the keyed signals from the input device KI4 are stored in the numeric data memory word A in the RAM4 in accordance with a sequence of instructions fetched from the read-only memory ROM4 by the central processing unit CPU4. Every time when the digit key is depressed, the central processing unit CPU4 transmits an address control signal through the address line ADL to the memory RAM4. Thereafter in accordance with a sequence of display instructions fetched from the read-only memory ROM4, the contents of the memory word A in the memory RAM4 is transmitted through the signal line DL into the memory DRAM4. Concurrently the central processing unit CPU4 places a read instruction on the signal line $\overline{R/W}$ and the address control signal on the address line ADL for identifying the address of the memory word in the data section β in the memory DRAM which is loaded with the contents of the numeric data memory word A in the memory RAM4.

Upon completion of the transfer of the numeric data into the DRAM4 in the manner described above, the signal line $\overline{R/W}$ returns to its initial condition, and the signal line DPL is in such a condition that the GATES AG34 and AG44 are closed so that in response to the output from the counter CNT4 the contents of the memory DRAM4 is displayed through the segment decoder SD4 as shown at (a) in FIG. 27.

Next assume that the operation key or the "multiplication" key is depressed. Then the central processing unit CPU4 identifies the actuation of "X" key, and the "multiplication" instruction will be stored in the instruction memory word E in the RAM4. And under the control of a sequence of instructions fetched out from the read-only memory ROM4 the content of the memory word A in the memory RAM4 is transmitted into the numeric data memory word B.

Next the second operand or numeric data is entered. As with the conventional electronic calculator the central processing unit CPU4 causes the memory word A in the memory RAM4 to clear because the contents of the instruction memory word E is not "0", and the numeric data or the second operand "45" is stored in the numeric data memory word A in the memory RAM4.

Next the contents or "45" of the data numeric memory word A in the memory RAM4 is stored into the numeric data section β in the memory DRAM4 under the control of the instructions fetched from the read-only memory ROM4 in a manner substantially similar to that described elsewhere, and the contents of the numeric data section β is transmitted through the segment decoder SD4 in response to the output from the counter CNT4 to the display circuits DISP14 and DISP24 and is displayed as shown at (c) in FIG. 27.

The operator depresses the "equal"key KE4 in order to obtain the product of the multiplicand and mulplier entered and stored in accordance with the sequence of the operational instructions preset in the electronic device.

The central processing unit CPU4 identifies the "equal" key EK4, and the multiplication instruction is stored in the instruction memory word F in the memory RAM4. The contents of the numeric data memory words A and B in the memory RAM4 are multiplied or processed in accordance with the instruction stored in the instruction memory word E, and the result is stored in the numeric data memory words C and D.

Next the contents of the instruction memory word F in the memory RAM4 is consulted in order to identify whether or not the key depressed is the "equal" key. Since the depressed key is the "equal" key EK4, the contents of the item number memory word IM in the memory RAM4 is read out by the central processing unit CPU4, and the data "+1" is fetched out of the read-only memory ROM4. Both the data or the contents of the item number memory word IM and the data "+1"are added, and the sum is stored in the item number memory word IM in the memory RAM4 in accordance with the sequence of instructions fetched out of the read-only memory ROM4. Thereafter the contents of the item number memory word IM in the RAM4 is transmitted to the numeric data section α in the DRAM4 in a manner substantially similar to that described above. In a like manner, the cntents of the numeric data memory word C or D in which is stored the sum is transmitted to the numeric data section β.

Figure 29:
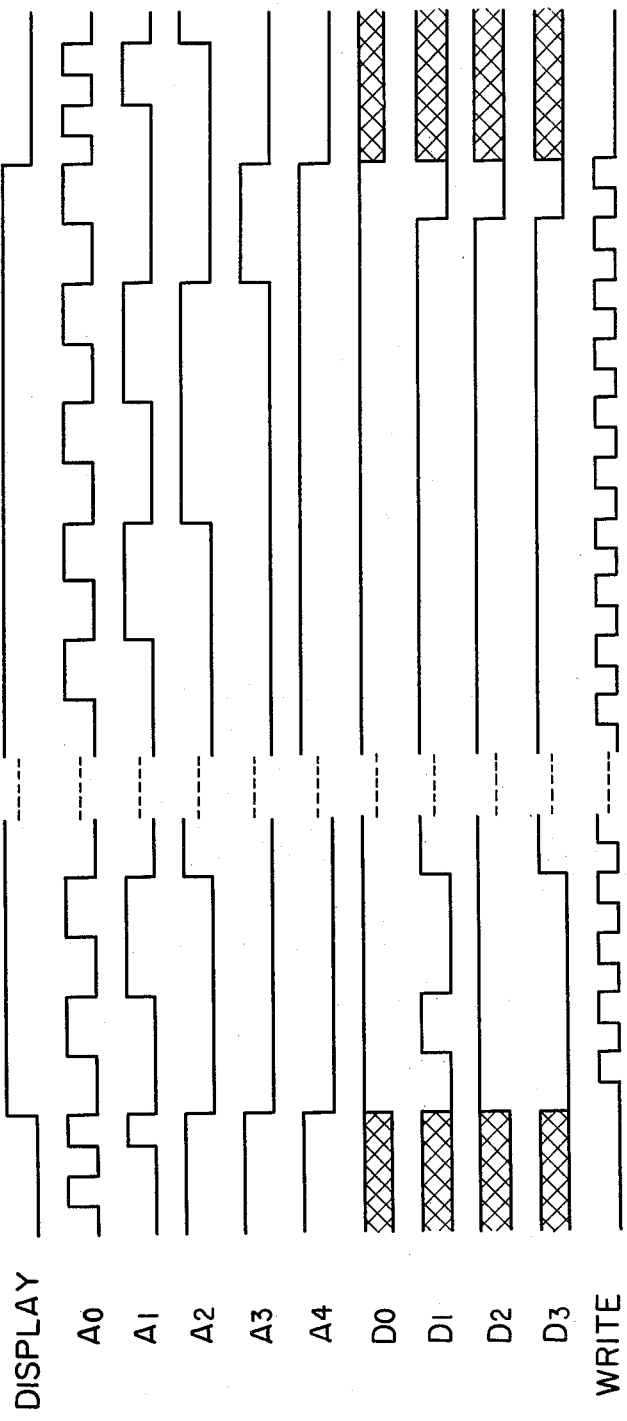
FIG. 29 shows various signal waveforms used for the explanation of the mode of loading a memory DRAM4 with numeric data.

FIG. 29 shows the signal waveforms generated when the numeric data is transmitted to the memory DRAM4.

First the central processing unit CPU4 places a high level signal H on the signal line DPL so that the contents of the memory RAM may be displayed.

The central processing unit CPU4 identifies the address of the memory word in the memory RAM4 the contents of which is transferred into the memory DRAM4 when the high-level signal H is placed on the signal line R/W̄.

Further referring to FIG. 29, the binary coded signals representing the decimal digits "5", "3", "5"and "5"are stored in the memory words from the least significant digit positions to the higher order positions in the order named in the numeric data section β. The hexadecimal digit "F" is stored in each of the remainng memory words. The binary coded signal representing the decimal digit "1" is stored in the memory word in the most significant digit position or the 10th array in the numeric data section α, and the hexadecimal digit "F" is stored in each of the memory words left of the most significant digit position.

When the signal on the signal lines DPL and R/W̄ drops to a low level L, in response to the contents or the output from the modulo-20 counter CNT the numeric data thus stored in the memory DRAM4 are sequentially transmitted to the segment decoder SD, and in response to the output from the digit position selection decoder DDE3 the numeric data are displayed as shown at (d) in FIG. 27.

Thereafter the next operand "678" is entered and displayed on the display panel DP24 as shown in at (e) in FIG. 27. Next the "multiplication" key is depressed, but the display remains unchanged as shown at (f) in FIG. 27. Next the multiplier "9" is entered and displayed as shown at (g) in FIG. 27. When the "equal"key is depressed, the contents of the memory word E in the memory RAM4 is incremented by one in a manner substantially similar to that described above, and the product "6102" and the number "2" of arithmenic operation steps completed are displayed as shown at (h) in FIG. 27.

In summary, according to the fifth embodiment of the present invention, the number of steps completed of a sequence of successive arithmetic operations may be displayed on one of the display panels. Therefore the operator may easily identify the number or the step of the arithmetic operations executed, and even when the operator suspended the execution of the successive arithmetic operations at any step, he may resume the operation exactly from the step which must be started first.

Sixth Embodiment, FIGS. 30 – 33

Briefly stated, the sixth embodiment of the present invention comprises first and second display means for displaying numeric data and means for displaying by the first and second display means the result of first and second operands when the result cannot be displayed by either of the first or second display means.

Figures 30, 32:
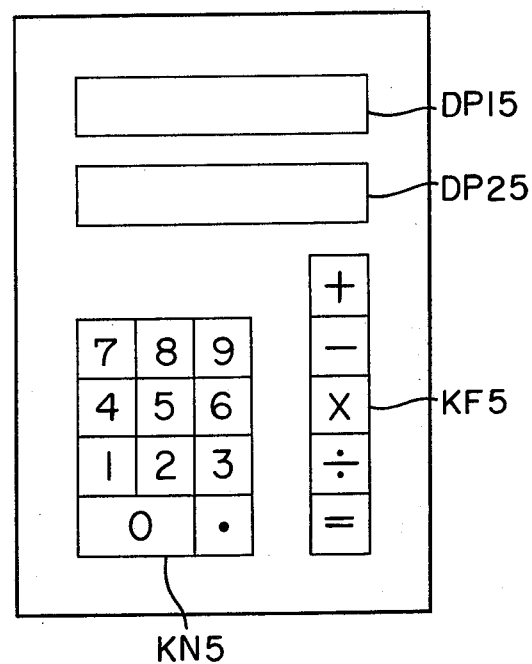

FIG. 30 is a top view of the sixth embodiment with first and second display panels DP15 abd DP25 and numeric and operation keys KN5 and KF5.

Figure 31:
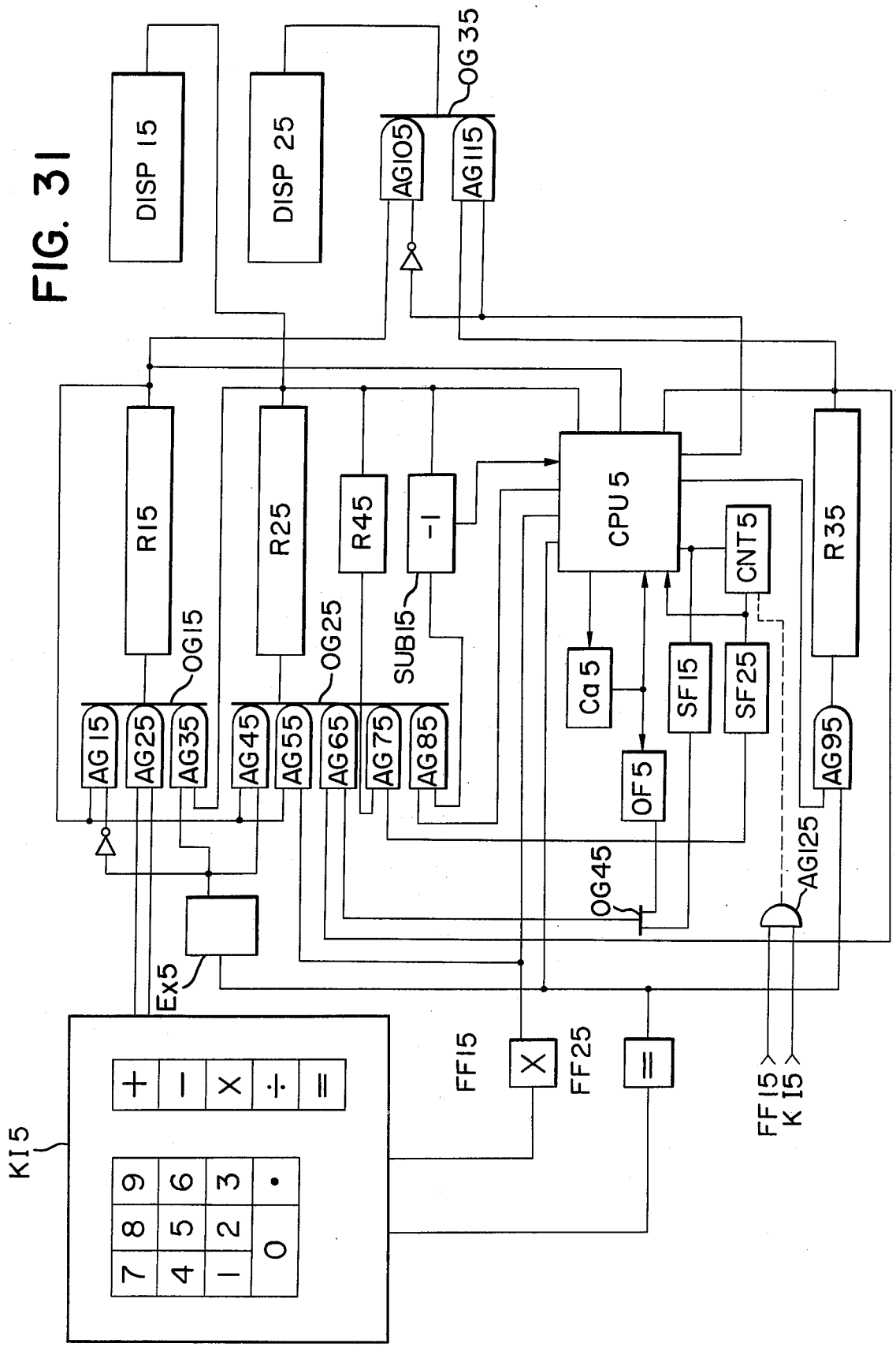
FIG. 31 is a schematic block diagram of the sixth embodiment.

In FIG. 31 there is shown a block diagram of the sixth embodiment. A keyboard input unit K15 has the numeric and operation keys KN5 and KF5 and generates the binary coded signals when these keys are depressed in a manner well known in the art.

The sixth embodiment includes AND gates AG15, AG25, . . . and AG125 and OR gates OG15, OG25, OG35 and OG45.

First, second and third registers R15, R25 and R35 each have a 9 digit positions so that a first and second decimal operands each with 8 digits may be processed. The first register R15 stores therein a numeric data entered from the keyboard input unit KI5; the second register R25 stores therein the numeric data transferred from the first register R15 when a next numeric data is to be stored therein; and the third register R35 stores therein a partial or total result of an arithmetic operation between the first and second operands stored in the second and first registers R25 and R15, respectively.

A fourth register R45 is used for shifting to the right the contents of the second register R25. (One shift to the right is attained for every 8 shifts to the left.)

A central processing unit CPU5 fetches the contents of an instruction register FF15 when the contents of a register or status flag FF25 is such that an "equal" key has been depressed, executes an arithmetic operation between the first and second operands stored in the second and first register R25 and R15, respectively, and stores the result in the third register R35. Whenever a carry occurs a "carry" status flat Ca5 generates a "carry" signal and transmits this signal to the central processing unit CPU5 and an overflow circuit OF5.

In order to deal with 8-digit operands, there is provided a modulo-8 counter CNT.

A data exchange circuit EX5 is responsive to the signal from the register or the status flag FF25 for exchanging data between the first and second registers R15 and R25.

A "−1" subtractor SUB15 subtracts "1" from the contents of the second register R25.

A first shift circuit SF15 is responsive to the signal from the central processing unit CPU5 for generating a shift signal. A second shift circuit SF25 is activated when the contents of the counter CNT5 becomes "7" so as to generate a shift signal in response to which the contents of the second register R25 is shifted to the right by one place.

A first display circuit DISP15 is connected to the display panel DP15 (see FIG. 30) for displaying the contents of the second register R25, and a second display circuit DISP25 is connected to the display panel DP25 (See FIG. 30) for displaying the contents of either the first or third register R15 or R35. Each of the first and second display circuits DISP15 and DISP25 has 8 arrays of seven-segment display units which are driven in a time-division manner.

Next the mode of operation of the sixth embodiment with the above construction will be described in conjunction with the following multiplication:

9 8 7 6 5 4 3 2 × 7 8 9

The operator depresses the numeric keys on the keyboard input unit KI5 to enter a first operand; that is, "9 8 7 6 5 4 3 2 ", which in turn is transmitted through AND gate AG25 and OR gate OG15 to the first register R15 and stored therein. The contents of this register R15 is transmitted through AND gate AG105 and OR gate OG35 to the second display circuit DISP25 so that the first operand is displayed as shown at (a) in FIG. 32.

Next the operator depresses the "multiplication" key. Then the "multiplication" instruction is stored in the first status register or flag FF15, and in response to the contents of this flag FF15 the AND gate AG55 is opened so that the contents of the first register R15 is transferred into the second register R25 and the first register R15 is cleared. The contents of the second register R25 is transmitted to the first display circuit DISP15 so that the first operand is displayed as shown at (b) in FIG. 32.

Next the operator enters a second operand; that is, "7 8 9 ". Then, it is stored into the first register R15 in the manner described above, and the contents of the first register R15 is transmitted to the second display circuit DISP25 so that the first and second operands are displayed as shown at (c) in FIG. 32.

Next the operator depresses the "equal" key. Then the "equal" signal thus activated is stored in the second status register or flag FF25, and in response to the enabling of the flag FF25 with this signal, the exchange circuit Ex5 causes the exchange of the contents of the first and second registers R15 and R25 through AND gates AG35 and AG45. At this step the contents of the first, second and third registers R15, R25 and R35 are as shown at (b) in FIG. 33.

Thereafter the multiplication is started. That is, the contents of the first register R15 is recirculated through AND gate AG15 and is also stored in the third register R35 through the central processing unit CPU5. Concurrently the contents of the second register R25 is subtracted by "1". At this step the contents of the first, second and third registers R15, R25 and R35 become as shown at (c) in FIG. 33.

The above step is recycled again. The result is that, as shown at (d) in FIG. 33, the contents of the third register R35 is doubled and the contents of the second register R25 is further subtracted by "1" to "787". The similar steps are recycled until the contents of the least significant digit position in the second register R25 becomes "0". Then the subtraction circuit 15 transmits a "carry" signal to the central processing unit CPU5 so that the operation is suspended and in response to the signal from the central processing unit CPU5 the contents of the counter CNT5 becomes "1". In response to the contents of the counter CNT5, the first shift circuit SF15 is set, and in response to the contents of the most significant digit position or the 9-th place in the third register R35 the "carry" status flag Ca5 generates the "carry" signal. As a result, the overflow circuit OF5 is set, and AND gate AG65 is opened so that the contents or "8" of the least significant digit position in the third register R35 is transferred into the second register R25. Concurrently the contents of the second register R25 is shifted to the right by one place as shown at (f) in FIG. 33. That is, the contents of the least significant digit position in the second register R25 is now "8" which has been in the second place.

The addition of the contents of the first register R15 to the contents of the third register R35 continues until the contents of the least significant digit position in the second register R25 becomes "0" in a manner substantially similar to that described above. When the contents of the least significant digit position becomes "0", the least significant digit "4" in the third register R3 is transferred into the second register R25 as shown at (j) in FIG. 33 in a manner substantially similar to that described above.

Figure 33:
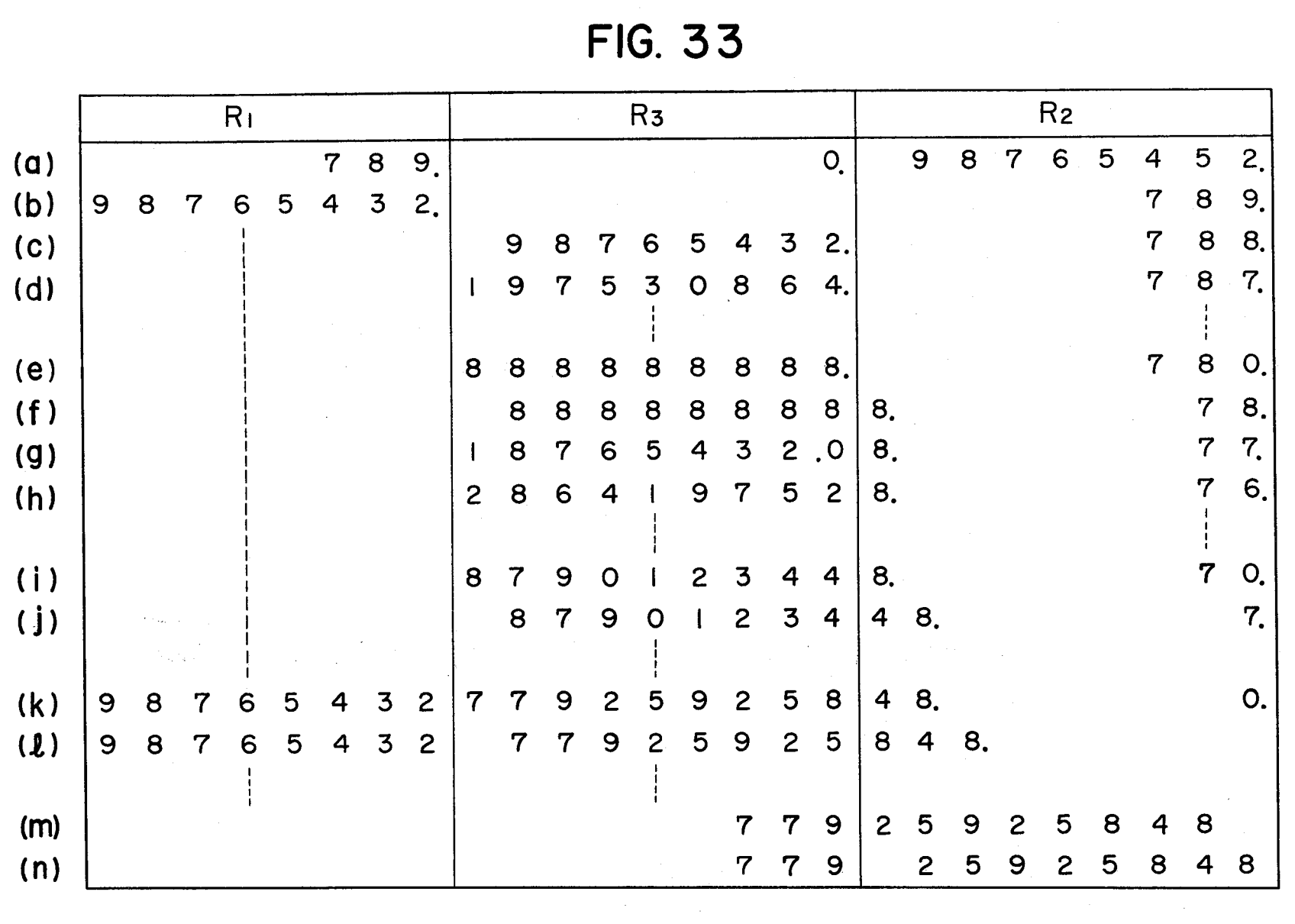

FIG. 33(*i*) shows the contents of the registers R15, R25 and R35 when the multiplication of the contents or "98765432" of the first register R15 by the second digit "8" of the multiplier "789" is completed. FIG. 33(*k*) shows the contents of the registers R15, R25 and R35 when the multiplication of the contents of the first R15 by the third digit "9" of the multiplier is completed and FIG. 33(*l*) shows that the least significant digit "8" in the third register R35 is transferred into the second register R25.

Thereafter the remaining digits are sequentially applied to the subtraction circuit SUB15, but they are all "0s" the subtraction circuit SUB15 transmits the "carry" signal to the central processing unit CPU5 which in turn transmits the signal to the first shift circuit SF15 and the counter CNT5. As a result, the contents of both the register R25 and R35 are shifted. This step is recycled until the counter CNT5 reaches "7". When the contents of the counter CNT5 becomes "7"; that is, when 8 digits of the lower order of the contents of the third register R35 have been shifted and transferred into the second register R25, the contents of the third and second registers R35 and R25 become as shown at (m) in FIG. 33. Concurrently, the shift circuit SF25 causes the contents of the second register R25 to shift to the right through the fourth shift register R45 so that the contents of the second register R25 becomes as shown at (n) in FIG. 33. Thereafter in response to the "finish" signal from the central processing unit CPU5, AND gate AG115 is opened so that the total product "77925925848" is displayed on the first and second display panels as shown in FIG. 32(d).

Alternatively, according to the present invention, the total product may be displayed as shown at (e) in FIG. 32. To this end, an AND gate AG125 is provided which is enabled in response to the output from the instruction flag FF15 so that the number of digits of a second operator; that is, the multiplier "789" may be transmitted, as the digit keys are depressed, to the counter CNT5 so as to count up the number. The counter CNT counts down in response to the signal from the central processing unit CPU which is generated every time when the central processing unit CPU5 receives the "carry" signal form the subtraction circuit SUB15. When the arithmetic operation is terminated when the contents of the counter CNT5 becomes zero, the total product or result may be displayed as shown at (e) in FIG. 33. In response to the contents "0" of the counter CNT5, the second shift circuit SF25 causes the second shift register R25 to shift to the right by one place (The shift to the right by one place is attained by the repetitive of the left rotations), so that the total product may be displayed as shown at (e) in FIG. 32. Thus the operator may easily identify the total product.

In summary, according to the sixth embodiment of the present invention, even when a result overflows a display panel, it may be displayed on two display panels without the omission of any lower order digits.

What we claim is:

1. Electronic equipment for handling numerical information comprising:
   numeral input means for entering numerical information;
   instruction input means for entering an operational instruction;
   execution directing means for directing the execution of the operational instruction;
   first and second display means for displaying numerical information;
   third display means for displaying the operational instruction; and
   display control means for causing said first display means to display a first operand in response to the entry of the first operand as numerical information into said numeral input means, causing said third display means to display an operational instruction as well as second display means to display the first operand in response to the subsequent entry of the operational instruction into said instruction input means, and causing said first display means to display a second operand in response to the entry of the second operand as numerical information into said numeral input means.

2. Electronic equipment in accordance with claim 1, further comprising operational means responsive to said execution directing means for operating on the first and second operands in accordance with the operational instruction to produce an operational result, said display control means causing the operational result to be displayed on said second display means.

3. Electronic equipment in accordance with claim 1, further comprising means responsive to another entry of the operational instruction subsequent to a sequential entry of the first operand, the operational instruction and the second operand for distinguishing the other entry of the operational instruction from the sequential entry to produce a signal, and operational means responsive to the signal from said distinguishing means for operating on the first and second operands in accordance with the operational instruction to produce an operational result, said display control means causing the operational result to be displayed on said first display means in response to the signal from said distinguishing means.

4. Electronic equipment in accordance with claim 1, further comprising operational means responsive to said execution directing means for operating on the first and second operands in accordance with the operational instruction to produce an operational result, and fourth display means for displaying numerical information, said display control means causing the operational result to be displayed on said fourth display means.

5. Electronic equipment in accordance with claim 4, wherein, when a third operand has been entered into said numeral input means as numerical information after the completion of operations between the first and second operands in response to said execution directing means, and operations are completed between the first and third operands in response to said execution directing means operated subsequently, said display control means causes the first operand to be displayed on said second display means, the third operand to be displayed on said first display means, and an operational result from the first and third operands to be displayed on said fourth display means.

6. Electronic equipment for performing numerical processing comprising:
   numeral input means for entering numerical information;
   instruction input means for entering an operational instruction;
   execution direction means for directing the execution of the operational instruction;
   first, second and third memories for storing numerical information;
   input control means for causing said first memory to store a first operand in response to entry of the first operand into said numeral input means as numerical information, causing the first operand to be moved from said first memory to said second memory in response to the subsequent entry of the operational instruction into said instruction input means, and causing a second operand to be stored in said first memory in response to the entry of the second operand into said numeral input means as numerical information;
   operational means for operating on the numerical information stored in said first and second memories to produce an operational result;
   operational control means responsive to said instruction input means for permitting said operational means to operate on the first and second operands stored in said first and second memories, in accordance with the operational instruction, to store the operational result in said first memory, and subsequently permitting said operational means to operate on the operational result and the numerical information stored in said third memory to store the operational result therefrom in said third memory;
   first and second display means for displaying numerical information; and
   display control means for applying the contents of said first memory to said first display means to thereby display the contents of said first memory on said first display means, and for causing the contents of said third memory to be displayed on said second display means.

7. Electronic equipment for performing numerical processing comprising:
   numeral input means for entering numerical information:
   instruction input means for entering an operational instruction;
   execution directing means for directing the execution of the operational instruction;
   first, second and third memories for storing numerical information;
   input control means for causing said first memory to store a first operand in response to the entry of the first operand into said numeral input means as numerical information, causing the first operand to be moved from said first memory to said second memory in response to the subsequent entry of the operational instruction into said instruction input means, and causing a second operand to be stored in said first memory in response to the entry of the second operand into said numeral input means as numerical information;
   operational means for operating on the numerical information stored in said first and second memories to produce an operational result;
   operational control means responsive to said instruction input means for permitting said operational means to operate on the first and second operands stored in said first and second memories, in accordance with the operational instruction, to store the operational result in said first memory, and subsequently permitting said operational means to operate on the operational result and the numerical information stored in said third memory to store the operational result therefrom in said third memory;
   first and second display means for displaying numerical information;
   selection means for alternatively selecting either a first or a second display mode; and
   display control means for applying the contents of said first memory to said first display means to display the contents of said first memory on said first display means and for applying the contents of said third memory to said second display means to display the contents of said third memory on said second display means in response to the selection of the first display mode, and for causing said first display means to display the contents of said first memory and said second display means to display contents of said second memory in response to the selection of the second display mode.

8. Electronic equipment for performing numerical processing comprising:
   input means for entering numerical information;
   first and second display means for displaying numerical information;
   mode selection means for alternatively selecting either a first or second display mode;
   first display control means for causing said first display means, when the first display mode has been selected, to display a first operand in response to the entry of the first operand into said input means as numerical information, and to display a second operand instead of the first operand in response to the entry of the second operand into said input means; and
   second display control means for causing, when the second display mode has been selected, said second display means to display the first operand in response to the entry of the first operand into said input means, and said first display means to display the second operand in response to the entry of the second operand into said input means.

9. Electronic equipment in accordance with claim 8, wherein said second display control means causes, in response to the entry of the first operand into said input means, the first operand to be displayed on said first display means and subsequently on said second display means.

10. Electronic equipment in accordance with claim 9, further comprising instruction means for entering an operational instruction, said second display control means causing said first display means to display the first operand in response to the entry of the first operand into said input means, causing said second display means instead of said first display means to display the first operand in response to the subsequent entry of the operational instruction into said instruction means, and causing said first display means to display the second operand in response to the entry of the second operand into said input means.

11. Electronic equipment in accordance with claim 9, further comprising instruction means for entering an operational instruction, and third display means for displaying the operational instruction, said second display control means causing said first display means to display the first operand in response to the entry of the first operand into said input means, causing said second display means instead of said first display means to display the first operand as well as said third display means to display the operational instruction in response to the entry of the operational instruction into said instruction means, and causing said first display means to display the second operand in response to the entry of the second operand into said input means.

12. Electronic equipment in accordance with claim 8, further comprising instruction means for entering an operational instruction and third display means for displaying the operational instruction, said second display control means being adapted to cause said third display means to display the operational instruction in response to the entry of the operational instruction into said instruction means.

13. Electronic equipment in accordance with claim 8, wherein each of said first and second display means is provided with filaments, and wherein said first display control means causes said second display control means to switch the electric supply to the filaments.

14. Electronic equipment comprising:
   a first memory for storing therein first numeric data;
   a second memory for storing therein second numeric data;
   first display means for displaying the first numeric data;
   second display means for displaying the second numeric data;
   arithmetic and logic means for executing an arithmetic operation on the first and second numeric data;
   means for determining when the result obtained from said arithmetic and logic means is of a magnitude such that it cannot be fully displayed on one of said display means; and
   control means responsive to a determination by said determining means for causing the result to be displayed on both said first and second display means.

* * * * *

UNITED STATES PATENT OFFICE
CERTIFICATE OF CORRECTION

Patent No. 4,138,734    Dated February 6, 1979

Inventor(s) SHINICHI NAKATA, ET AL.

It is certified that error appears in the above-identified patent and that said Letters Patent are hereby corrected as shown below:

Column 1, line 48, "of result the" should read --of the result--;

Column 4, line 38, after "processing" insert --unit--;

Column 7, line 53, "flat" should read --flag--;

Column 8, line 4, "R11 14 R41" should read --R11 - R41--;

Column 10, line 7, "EMK2 MEK2" should read --MEK2--;

Column 10, line 15, "K12" should read --KI2--;

Column 10, line 30, "K12" should read --KI2--;

UNITED STATES PATENT OFFICE
CERTIFICATE OF CORRECTION

Patent No. 4,138,734    Dated February 6, 1979

Inventor(s) SHINICHI NAKATA, ET AL.

It is certified that error appears in the above-identified patent and that said Letters Patent are hereby corrected as shown below:

Column 13, line 6, "instruction" should read --instructions--;

Column 20, line 66, change "flat" to --flag--;

Column 22, line 43, change "first R15" to --first register R15--;

Column 24, line 34, claim 6, change "direction" to --directing--.

Signed and Sealed this

Fourth Day of December 1979

[SEAL]

Attest:

SIDNEY A. DIAMOND

Attesting Officer    Commissioner of Patents and Trademarks